US012520910B2

(12) United States Patent
Filus

(10) Patent No.: US 12,520,910 B2
(45) Date of Patent: Jan. 13, 2026

(54) CLOTHING CORD CLIP

(71) Applicant: Drew Ian Filus, Studio City, CA (US)

(72) Inventor: Drew Ian Filus, Studio City, CA (US)

(*) Notice: Subject to any disclaimer, the term of this patent is extended or adjusted under 35 U.S.C. 154(b) by 29 days.

(21) Appl. No.: 18/766,743

(22) Filed: Jul. 9, 2024

(65) Prior Publication Data

US 2025/0089855 A1    Mar. 20, 2025

Related U.S. Application Data

(63) Continuation-in-part of application No. 29/931,473, filed on Mar. 6, 2024, and a continuation-in-part of application No. 29/931,475, filed on Mar. 6, 2024, and a continuation-in-part of application No. 18/369,475, filed on Sep. 18, 2023, now Pat. No. 12,336,599, and a continuation-in-part of application No. 29/902,890, filed on Sep. 18, 2023.

(51) Int. Cl.
*A44B 6/00* (2006.01)
*A43C 7/04* (2006.01)

(52) U.S. Cl.
CPC .................. *A44B 6/00* (2013.01); *A43C 7/04* (2013.01); *Y10T 24/3705* (2015.01)

(58) Field of Classification Search
CPC .. A43C 7/00; A43C 7/04; A43C 19/00; A43B 23/24; A62B 1/14; A44B 6/00; Y10T 24/14; Y10T 24/29; Y10T 24/3936; Y10T 24/3956; Y10T 24/3716; Y10T 24/39; Y10T 24/3708; Y10T 24/3705; Y10T 24/3987; A44D 27/08; A44D 2201/00; A44C 13/00; A44C 13/02; A44C 15/00; A44C 15/005; A44C 17/0208; A44C 25/00; A44C 25/007; A44C 5/18; A44C 1/00; A44C 17/0225; A44C 17/0216; A44C 63/23; A44C 63/21; F16B 2/10; A61B 17/122; A61B 2017/1225
See application file for complete search history.

(56) References Cited

U.S. PATENT DOCUMENTS

| | | | | |
|---|---|---|---|---|
| 819,884 A | * | 5/1906 | Higgins | A43C 7/04 24/712.2 |
| 4,781,188 A | * | 11/1988 | Collins | A61B 17/122 606/120 |

(Continued)

*Primary Examiner* — Jason W San
*Assistant Examiner* — Rowland Do
(74) *Attorney, Agent, or Firm* — H. Brock Kolls

(57) ABSTRACT

The present invention relates to a clothing cord clip usable on clothing, backpack cords/straps, and numerous other cords or straps that include front and back plates that have gripping rails, a pinch ring, curvilinear locking ribs, and raised support ribs. A flexible connector interconnects the front and back plates, allowing the interior surfaces to be opposed, aligned, and press-fitted together, interlocking the curvilinear locking ribs. In operation, a clothing cord or other cord or strap can be positioned between the gripping rails and secured such that the clothing cord clip hangs the cord or strap. In exemplary embodiments, emblems are affixed to the exterior surface of the front and/or back plates. A recess channel in the front and back plates provides a clothing cord ingress and egress pathway through the clothing cord clip. The gripping rails can have teeth along a contact edge to grip the clothing cord.

20 Claims, 40 Drawing Sheets

(56) References Cited

U.S. PATENT DOCUMENTS

| | | | | |
|---|---|---|---|---|
| 5,022,127 | A * | 6/1991 | Ang | A43C 7/005 24/712.2 |
| 5,372,510 | A * | 12/1994 | Stanfield | G09B 19/0076 24/712.2 |
| 5,415,665 | A * | 5/1995 | Hessel | A61B 5/150038 600/573 |
| 5,671,508 | A * | 9/1997 | Murai | F16G 11/101 24/129 R |
| 6,044,527 | A * | 4/2000 | Ishida | F16G 11/101 24/115 F |
| D443,816 | S * | 6/2001 | Ikeda | D8/499 |
| 6,387,076 | B1 * | 5/2002 | Landuyt | A61M 25/02 604/174 |
| 8,739,373 | B1 * | 6/2014 | Berman | A43C 7/04 24/712.6 |
| 9,622,546 | B2 * | 4/2017 | Turdjian | A44B 11/06 |
| 11,058,181 | B2 * | 7/2021 | McKenzie | A43C 7/005 |
| 2002/0020046 | A1 * | 2/2002 | Voughlohn | A43C 1/00 24/712.1 |
| 2004/0215211 | A1 * | 10/2004 | Watson, Jr. | A61B 17/122 606/120 |
| 2005/0054985 | A1 * | 3/2005 | Mogg | A61M 25/02 604/174 |
| 2014/0020263 | A1 * | 1/2014 | Theuvenet | A43B 3/34 24/712.9 |
| 2015/0262515 | A1 * | 9/2015 | Leonardis | G09F 3/205 29/463 |
| 2025/0221496 | A1 * | 7/2025 | Allom | A43C 7/005 |

\* cited by examiner

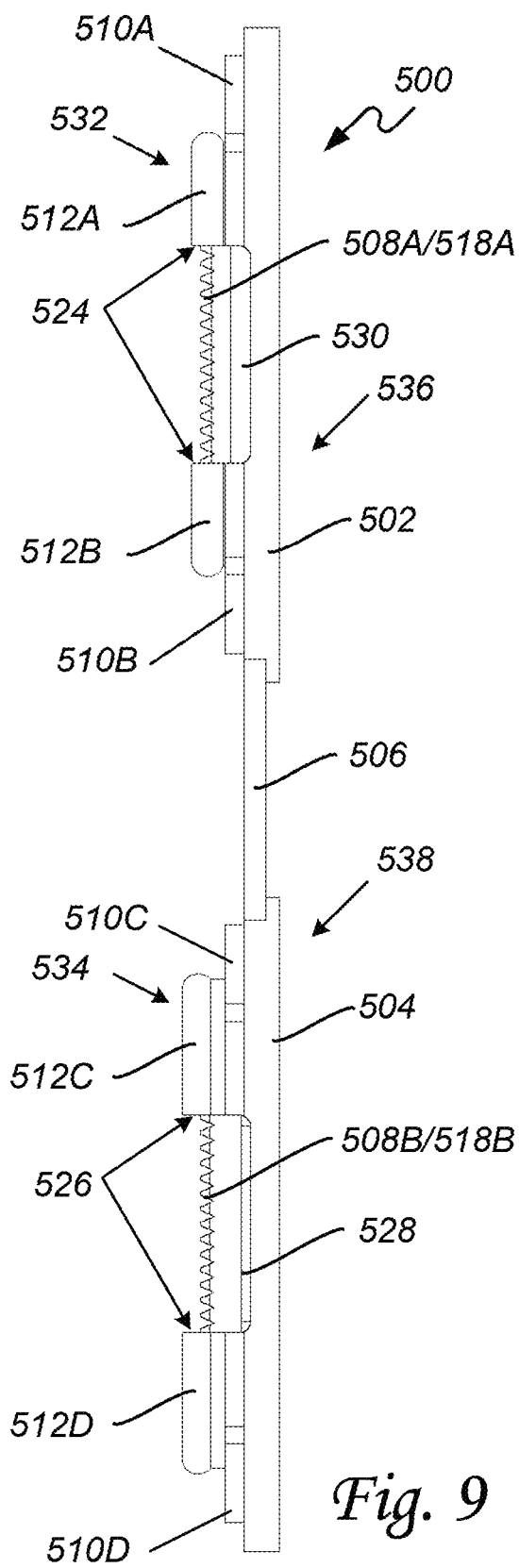
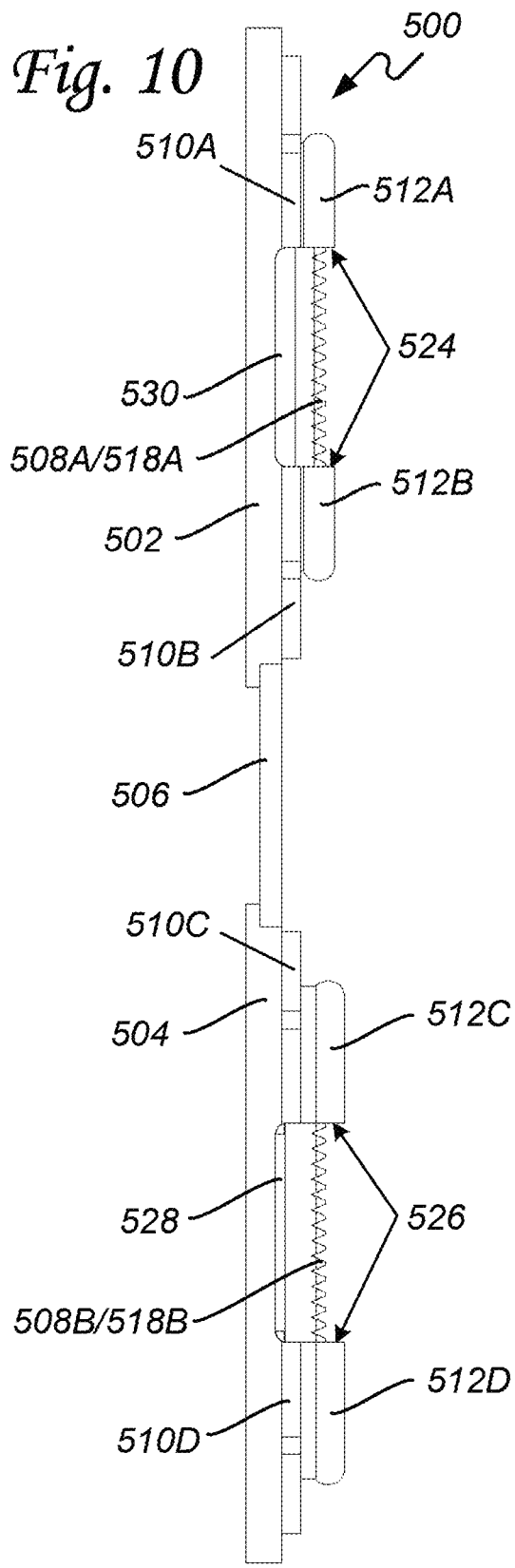
Fig. 9
Fig. 10

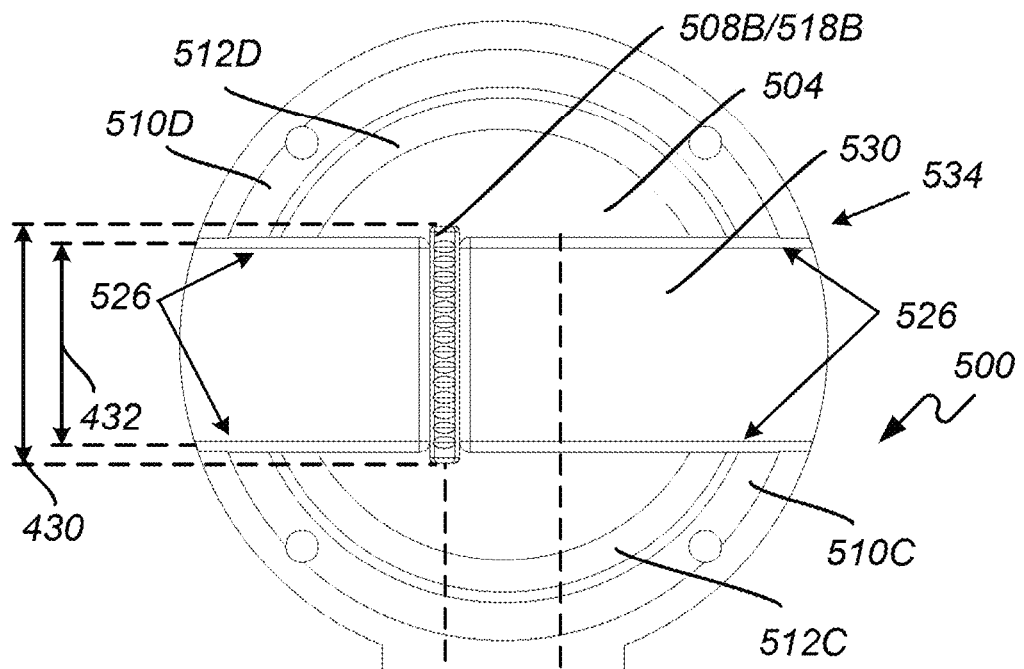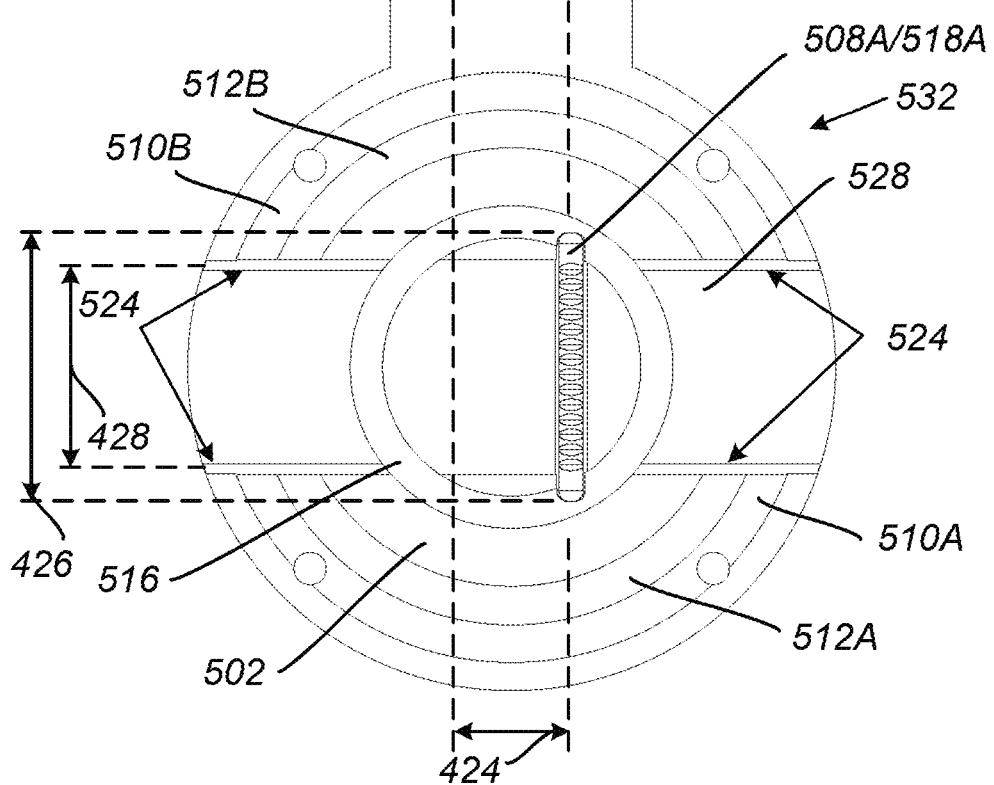
Fig. 13

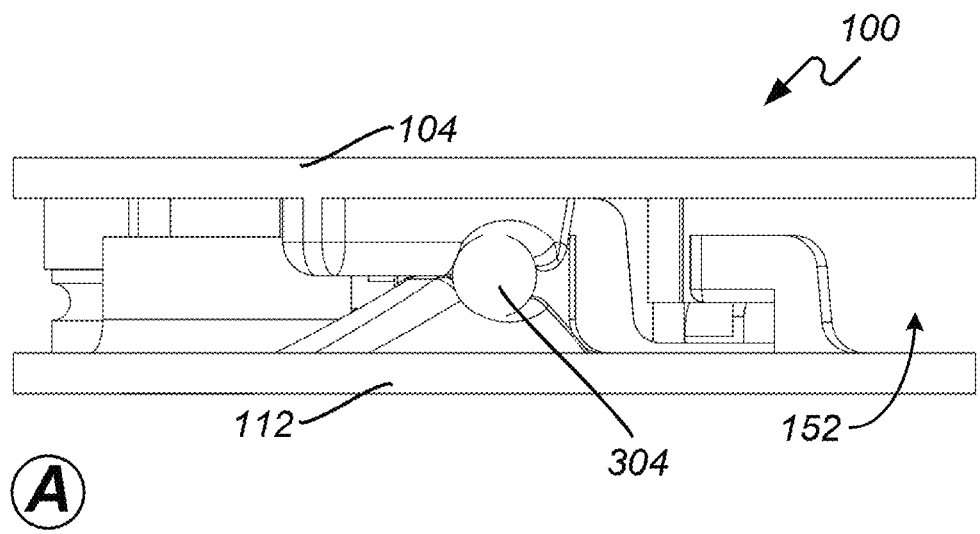
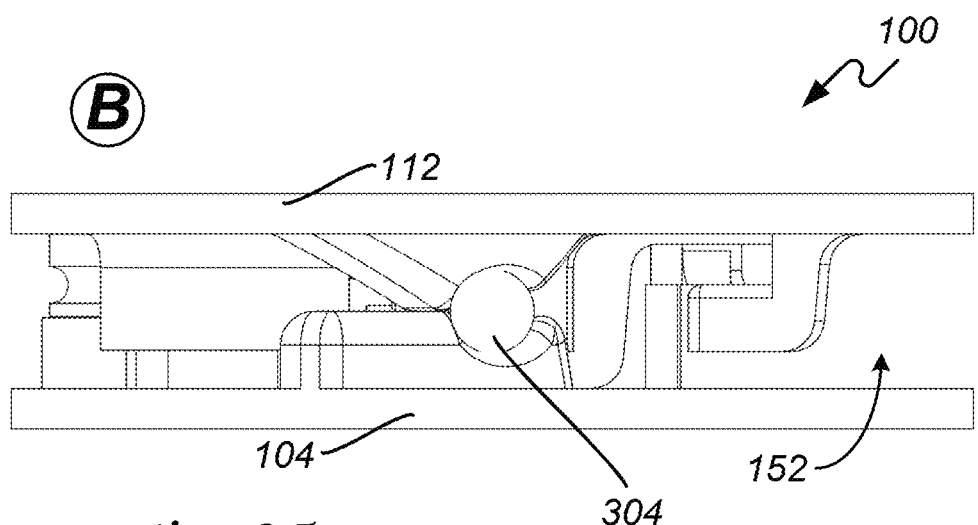
Fig. 35

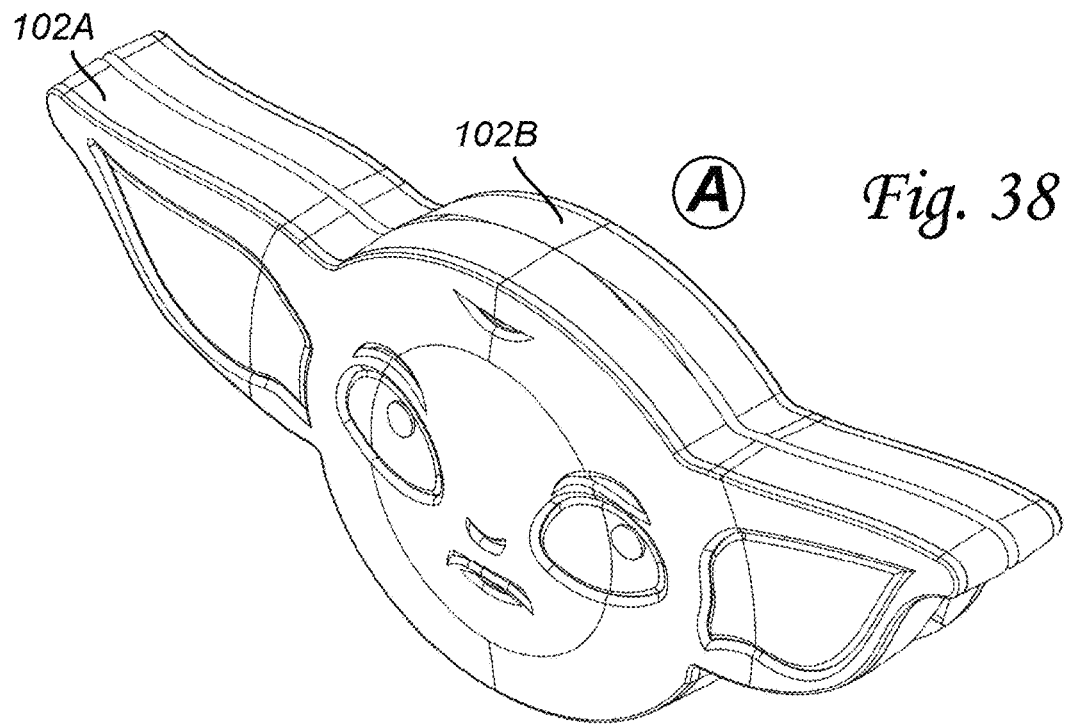
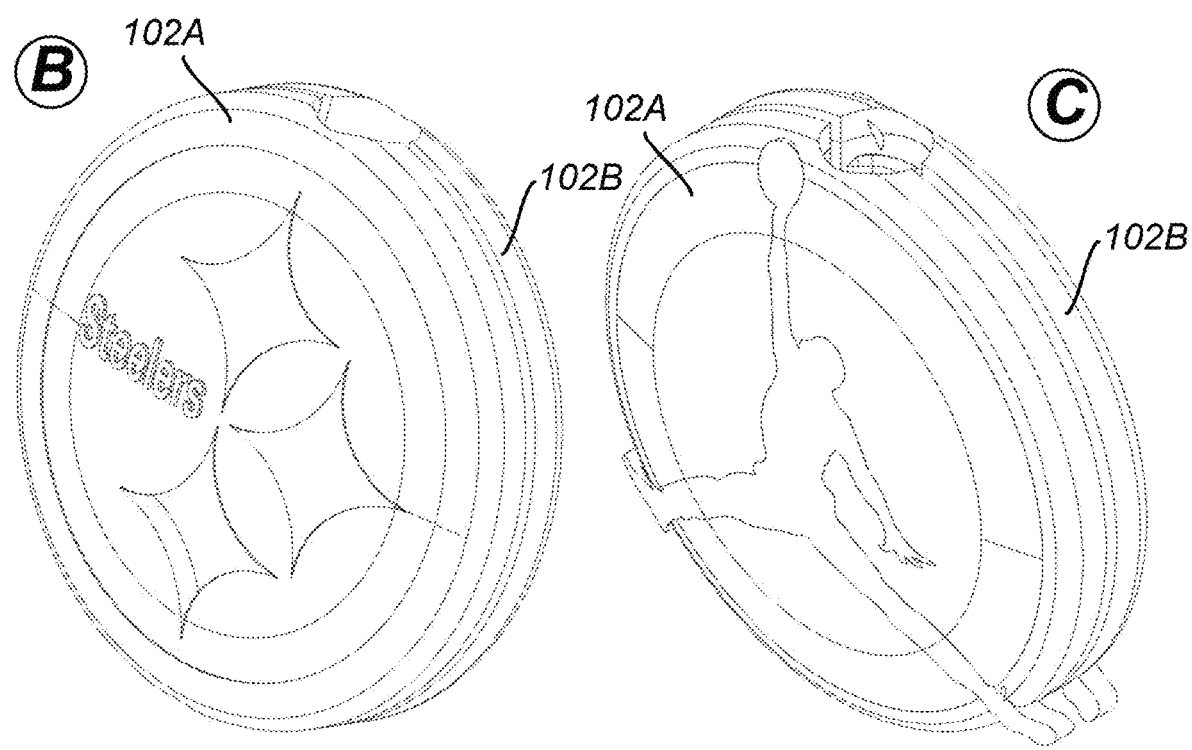
Fig. 38

*Fig. 42*
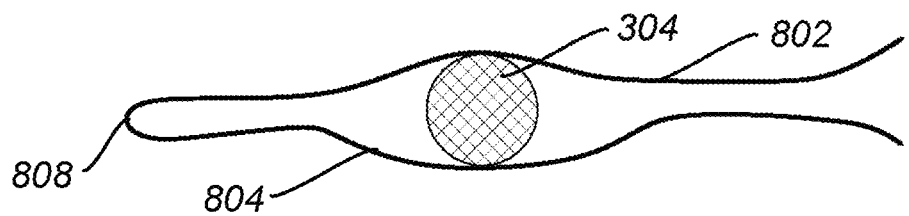
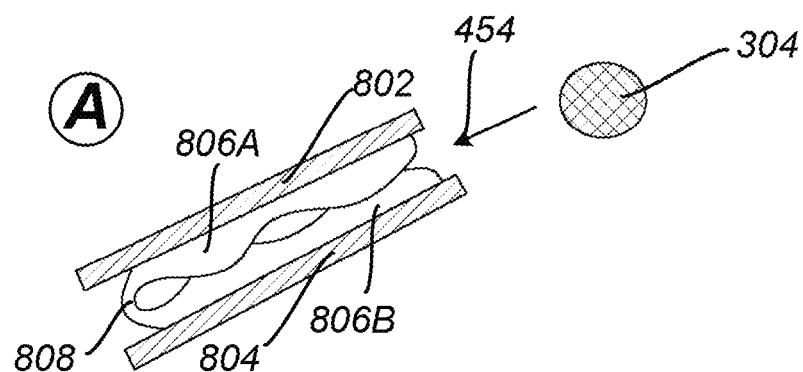
*Fig. 43*
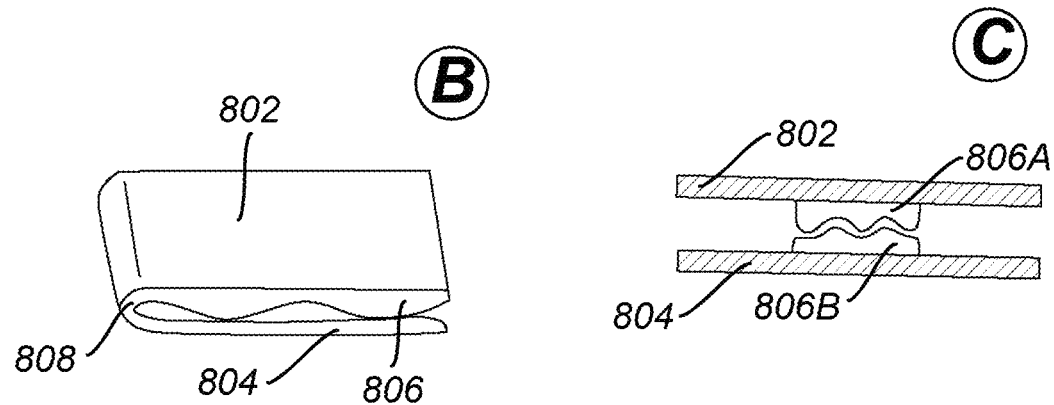

CLOTHING CORD CLIP

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. non-provisional application Ser. No. 18/369,475, inventor Drew Ian Filus, entitled "CLOTHING STRING CLIP THAT ATTACHES TO CLOTHING STRINGS", filed Sep. 18, 2023; which claims the benefit of a U.S. provisional application, Ser. No. 63/420,025, inventor Drew Ian Filus, entitled "DECORATIVE CLIP TO ATTACH TO CLOTHING STRINGS", filed Oct. 27, 2022;

This is a U.S. non-provisional application that is a continuation in part of a U.S. design application, Ser. No. 29/902,890, inventor Drew Ian Filus, entitled "CLOTHING STRING CLIP", filed Sep. 18, 2023;

This is a U.S. non-provisional application that is a continuation in part of a U.S. design application, Ser. No. 29/931,473, inventor Drew Ian Filus, entitled "WEARABLE CORD CLIP", filed Mar. 6, 2024; and This is a U.S. non-provisional application that is a continuation in part of a U.S. design application, Ser. No. 29/931,475, inventor Drew Ian Filus, entitled "WEARABLE CORD CLIP", filed Mar. 6, 2024.

TECHNICAL FIELD OF THE INVENTION

This invention relates a clothing cord clip that includes a front and back plate that has a gripping rail, a pinch ring, curvilinear locking ribs, and raised support ribs. A flexible connector interconnects the front plate and the back plate, allowing the interior surfaces to be opposed, aligned, and press-fitted together by interlocking the curvilinear locking ribs. In operation, a clothing cord can be positioned between the gripping rails and secured so that the clothing cord clip can hang from the clothing cord. In exemplary embodiments, emblems can be affixed to the exterior surface of the front and/or back plate.

BACKGROUND OF THE INVENTION

Before our invention clothing strings such as those on hoodies, sweatpants, sweatshirts, shorts, backpacks, and other items were highly visible but from a fashion perspective mostly ignored. Their intended purpose is most often associated with cinching, closings, or otherwise tightening an opening such as on pants, a hood, or other openings.

A shortcoming with clothing strings is that while they are sized to encompass the circumference of an opening often they can be pulled one way or the other causing one end of the clothing string to ingress into the item rendering it unreachable by the user.

Another shortcoming with clothing strings can be their length which can hang down from an item in an excessive length and/or undesirable manner, or become wadded up such as when tying two ends into a bow which can be bulky and unattractive-looking. In both cases, while the functionality of the clothing strings has a purpose there are limited options for managing the loose end of the clothing strings while at the same time enhancing the fashion look of the item being worn by the user.

The present invention addresses these and other shortcomings by providing a clothing cord clip that attaches to clothing cords and provides other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a clothing cord clip that comprises a front plate that has a first exterior surface and a first interior surface, the first interior surface comprises at least one of a first gripping rail, a pinch ring positioned around the first gripping rail, more than one of a first curvilinear locking rib positioned around the pinch ring, and more than one of a first raised support rib positioned around the first curvilinear locking rib. A back plate has a second exterior surface and a second interior surface. The second interior surface can comprise at least one of a second gripping rail, more than one of a second curvilinear locking rib positioned around the second gripping rail, and more than one of a second raised support rib positioned around the second curvilinear locking rib. A flexible connector interconnects the front plate and the back plate, allowing the first interior surface and the second interior surface to be opposed, aligned, and press-fitted together by interlocking the first curvilinear locking rib and the second curvilinear locking rib.

In operation, at least one clothing cord is positioned between the first gripping rail and the second gripping rail. The clothing cord is secured between the pinch ring and the first gripping rail, the pinch ring and the second gripping rail, the first gripping rail and the second interior surface, and the second gripping rail and the first interior surface.

Additional shortcomings of the prior art are overcome and additional advantages are provided through the provision of a clothing cord clip that comprises a front plate that has a first exterior surface and a first interior surface. The first interior surface can comprise at least one first gripping rail, a pinch ring positioned around the first gripping rail, more than one of a first curvilinear locking rib positioned around the pinch ring, more than one of a first raised support rib positioned around the first curvilinear locking rib, and a first recess channel that traverses the first interior surface. A back plate has a second exterior surface and a second interior surface. The second interior surface can comprise at least one second gripping rail, more than one second curvilinear locking rib positioned around the second gripping rail, more than one second raised support rib positioned around the second curvilinear locking rib, and a second recess channel that traverses the second interior surface. A flexible connector interconnects the front plate and the back plate, The flexible connector can be bent allowing the first interior surface and the second interior surface to be opposed, aligned, and press-fitted together by interlocking the first curvilinear locking rib and the second curvilinear locking rib.

In operation, when the front plate and the back plate are interlocked together the first recess channel and the second recess channel are opposed and aligned, creating an ingress and egress pathway for the clothing cord, through the clothing cord clip. At least one clothing cord can be positioned through the first channel recess and the second channel recess and between the first gripping rail and the second gripping rail. The clothing cord can be secured between the pinch ring and the first gripping rail, the pinch ring and the second gripping rail, the first gripping rail and the second interior surface, and the second gripping rail and the first interior surface.

Additional shortcomings of the prior art are overcome and additional advantages are provided through the provision of a clothing cord clip that comprises a front plate that has a first exterior surface and a first interior surface. The first interior surface comprises at least one of a first gripping rail, a pinch ring positioned around the first gripping rail, more than one of a first curvilinear locking rib positioned around the pinch ring, and more than one of a first raised support rib positioned around the first curvilinear locking rib. A back plate that has a second exterior surface and a second interior surface. The second interior surface comprises at least one of a second gripping rail, more than one of a second curvilinear locking rib positioned around the second gripping rail, and more than one of a second raised support rib positioned around the second curvilinear locking rib. A flexible connector interconnects the front plate and the back plate, allowing the first interior surface and the second interior surface to be opposed, aligned, and press-fitted together by interlocking the first curvilinear locking rib and the second curvilinear locking rib. At least one emblem can be secured to at least one of the first exterior surface or the second exterior surface.

In operation, at least one clothing cord can be positioned between the first gripping rail and the second gripping rail. The clothing cord can be secured between the pinch ring and the first gripping rail, the pinch ring and the second gripping rail, the first gripping rail and the second interior surface, and the second gripping rail and the first interior surface.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 4-14 illustrate one example of a clothing cord clip that folds around one or more clothing cords and press fits together with emblem mounting holes;

FIG. 35 illustrates one example of a top view and a bottom view of a clothing string clip;

FIG. 38 illustrates exemplary embodiments of emblems;

FIG. 41-43 illustrates examples of a clothing cord clip that pinches together;

The detailed description explains the preferred embodiments of the invention, together with advantages and features, by way of example with reference to the drawings.

DETAILED DESCRIPTION OF THE INVENTION

Figure 1:
FIGS. 1-3 illustrate examples of a user wearing a clothing string clip on a clothing string.
Figure 2:
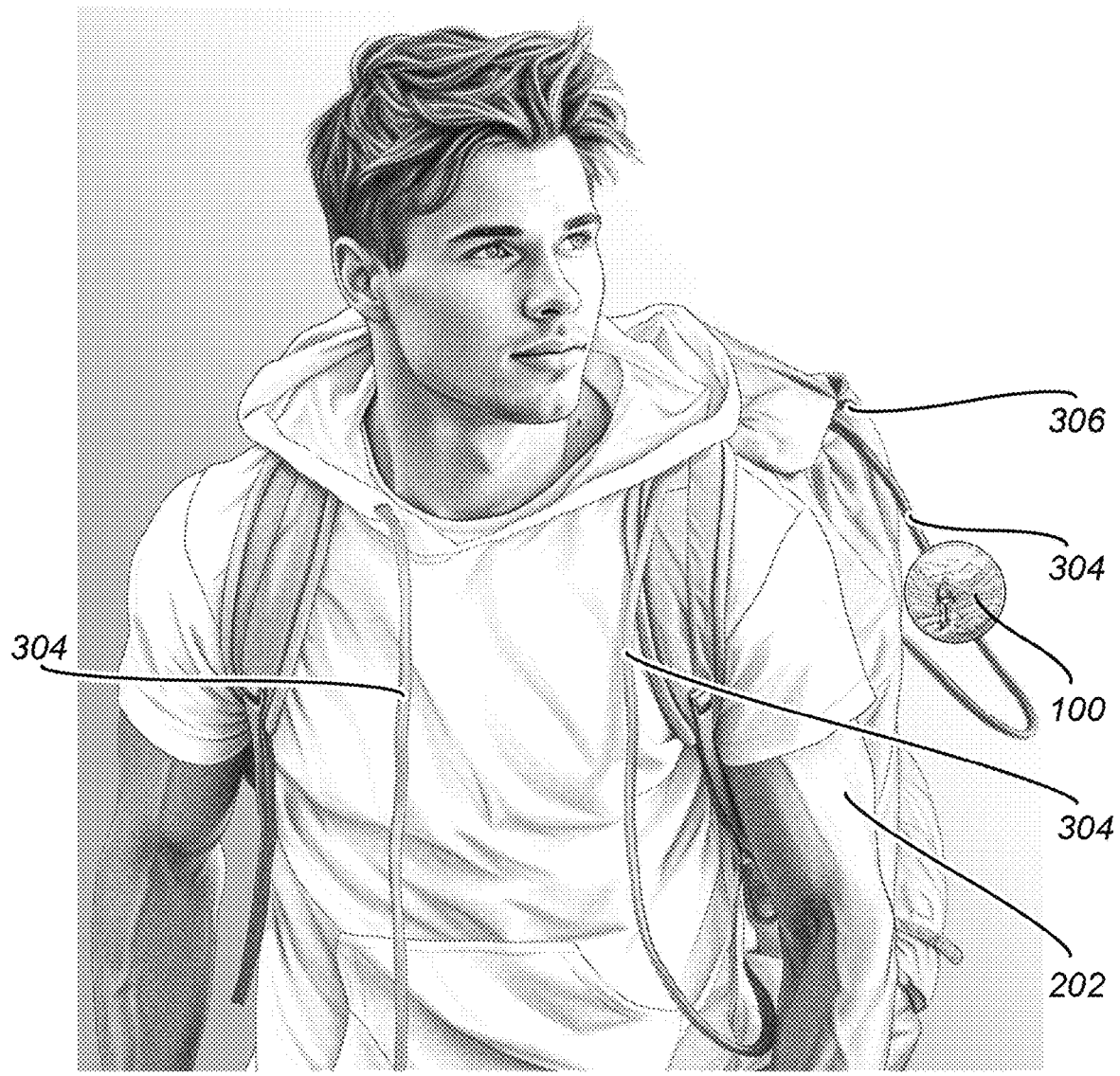
Figure 3:
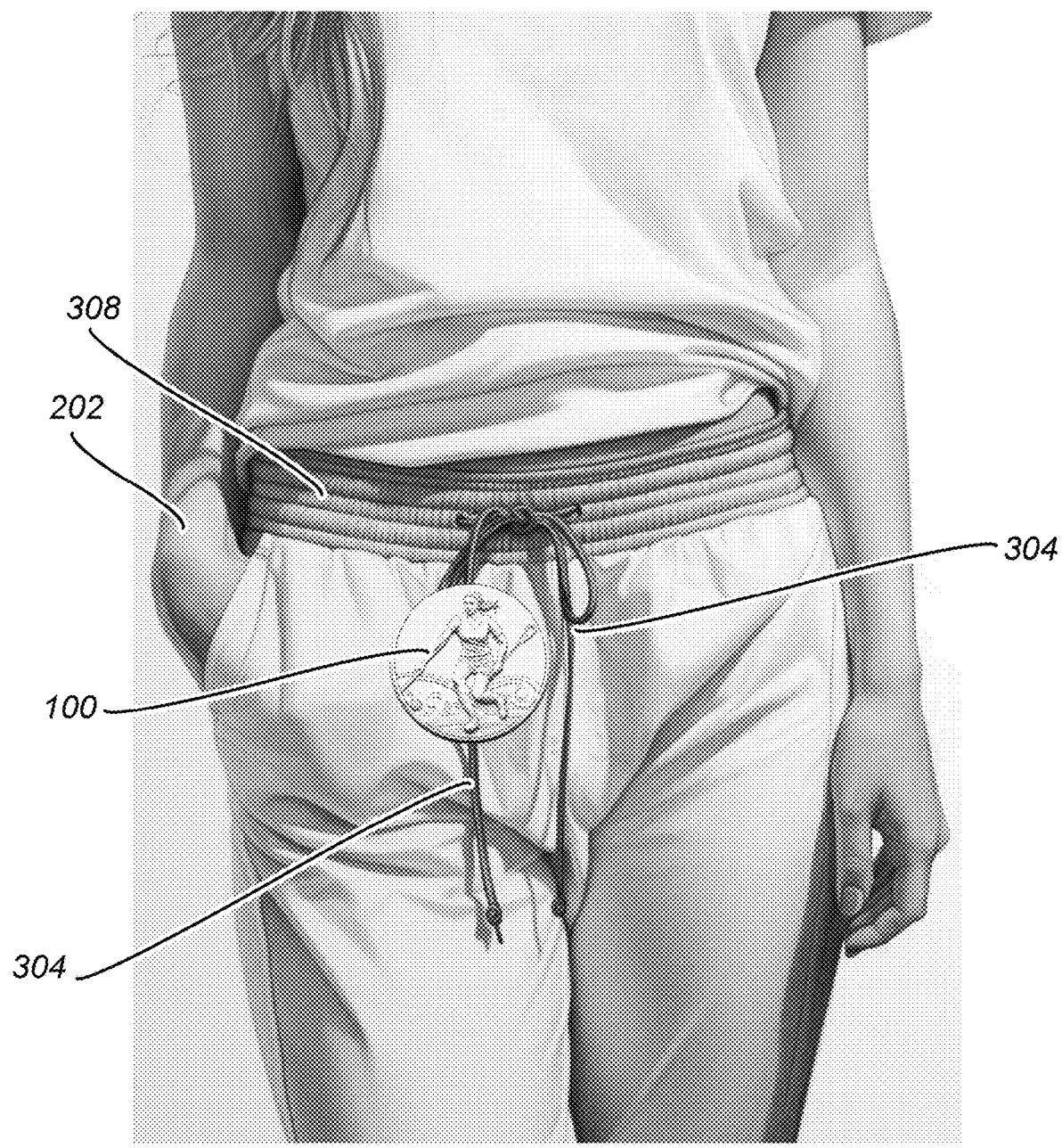

Turning now to the drawings in greater detail, it will be seen that in FIGS. 1 through 3 there are illustrated examples of user 202 wearing or otherwise using a clothing string clip 100 or clothing cord clip 500 on a clothing string/cord 304. In an exemplary embodiment, in FIG. 1, user 202 is illustrated wearing outerwear 302 and other items. Such outerwear 302 and other items can be a hoodie, a windbreaker, a jacket, a coat, a sweatshirt, a shirt, backpack cords and straps, purses, lanyards, bag straps, luggage, or other types and/or kinds of clothing or other items without limitation. Such outerwear 302 can comprise clothing strings/cords 304 which can also be referred to as drawstrings. Such clothing strings/cords 304 can be proximate to a hood as a way to cinch tight around the head of user 202, around the waist of the jacket to cinch tight around the waist of user 202, or located in other positions in the outerwear 302, as may be required and/or desired in a particular embodiment.

In an exemplary embodiment, a clothing string clip 100 or clothing cord clip 500 can be attached or otherwise interconnected with the clothing string/cord 304. Any number of clothing string clip 100 or clothing cord clip 500 can be added to a clothing string/cord 304. Additionally, clothing string clip 100 or clothing cord clip 500 can be added to more than one of the clothing strings/cords 304 as many garments may have two or more as illustrated in at least FIG. 1.

An advantage, in the present invention, is that the clothing string clip 100 or clothing cord clip 500 while managing the loose end of clothing string/cord 304 from being pulled or otherwise ingressed backward into the clothing where the end is no longer accessible, the clothing string clip 100 or clothing cord clip 500 also acts as a display platform for fashionable emblems 102, charms, jewelry, and other items collectively referred to as emblems 102 or emblems 520 for disclosure purposes. In this regard, user 202 can select emblem 102/520 of all types that can be interconnected with the clothing string clip 100 or clothing cord clip 500 and worn by user 202. Such emblems 102/520 can be decorative, accomplishment-related, inspirational, or meaningful to the user 202 in other ways without limitation. As an example, and not a limitation, the clothing string clip 100 or clothing cord clip 500 in FIG. 1 comprises an emblem 102/520 that is the imagery of a butterfly, FIG. 2 comprises an emblem 102/520 that is the imagery of an outdoorsman, and FIG. 3 comprises an emblem 102/520 that is the imagery of sports. In general, in addition to being functional in managing the loose ends of clothing strings 340, the present invention also adds considerable fashion STRINGBLING to user 202 outfits.

In an exemplary embodiment, as examples and not limitations, applications, features, and/or use cases for the clothing cord clip 100/500/600/700/800 can include being illuminated, glowing in the dark, producing audio sounds, having computing power or be a computing accessory, or interfacing to a smartphone such as an iphone, Android, or other computing device. Continuing, being a flash or thumb drive, having a microphone for recording audio, being an interface to an artificial intelligence (AI) system, having wireless communication capabilities, having a camera, taking pictures or video by way of the camera, having a user display or user input capability, the display being a liquid crystal display (LCD) or other suitable display having the ability to scroll words, show images, etc., Continuing, being motorized for spinning and other purposes, being a mirror or locket, being a teething toy for babies, being a glasses holder, acting as a headphone case, or for other applications or purpose, as may be required and/or desired in a particular embodiment.

In an exemplary embodiment, the clothing string clip 100 or clothing cord clip 500/600/700/800 can be fabricated from plastic, elastomer, metal, rubber, a combination thereof, and/or other suitable materials as may be required and/or desired in a particular embodiment. Additionally, in an exemplary embodiment, the clothing string clip 100 or clothing cord clip 500 can be circular in shape, or other suitable shapes as may be required and or desired in a particular embodiment.

In an exemplary embodiment, the clothing string clip 100 or clothing cord clip 500 and emblem 102/520 can be fabricated in different shapes and sizes. Additionally, and with reference to at least FIG. 38, the emblems can be different shapes than the clothing string clip 100 or clothing cord clip 500, even shapes that are larger than the clothing string clip 100 or clothing cord clip 500 as long as the emblems 102/520 are configured to fasten to the front plate 112/502 and/or back plate 104/504, FIG. 38 reference 'A' is one example. Furthermore, emblems 102/520 can be configured to be secured to the front plate 112/502 and/or back plate 104/504, in a permanent manner or temporary manner, allowing user 202 to interchange the emblems 102/520, as may be required and/or desired in a particular embodiment.

Referring to FIG. 2 there is illustrated user 202 wearing a clothing string clip 100 on a clothing string/cord 304 that is part of a backpack 306. In this regard, the clothing string clip 100 or clothing cord clip 500 can be attached to the clothing string/cord 304 that is associated with backpack 306 or other types and/or kinds of purses, backpack cords and straps, lanyards, bag straps, luggage or other items having clothing string or cords 304. In a plurality of exemplary embodiments, clothing string clip 100 or clothing cord clip 500 can be interconnected or otherwise attached to all types of clothing strings/drawstrings/cords 304 that a user 202 might use or wear even if only worn or carried intermittently such as a backpack 306, hat, glasses, beanie, or other types and/or kinds of items as may be required and/or desired in a particular embodiment.

Referring to FIG. 3 there is illustrated one example of user 202 wearing a clothing string clip 100 or clothing cord clip 500 on a clothing string/cord 304 that is part of pants 306. In an exemplary embodiment, the clothing string clip 100 or clothing cord clip 500 can be worn on drawstring types of pants such as sweat pants, other types of pants, shoelaces, and other types and kinds of clothing without limitation.

Figure 4:
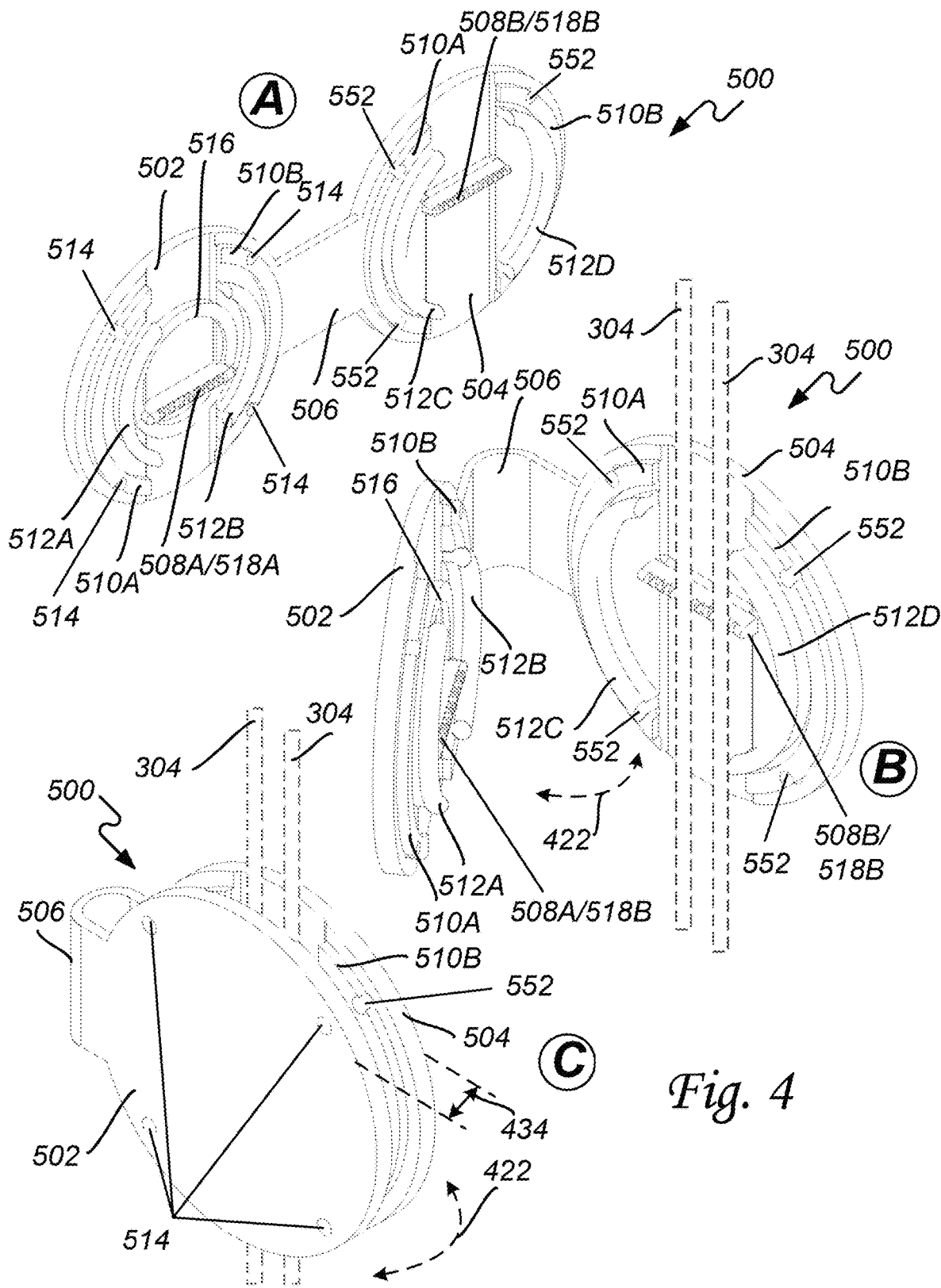
Figure 5:
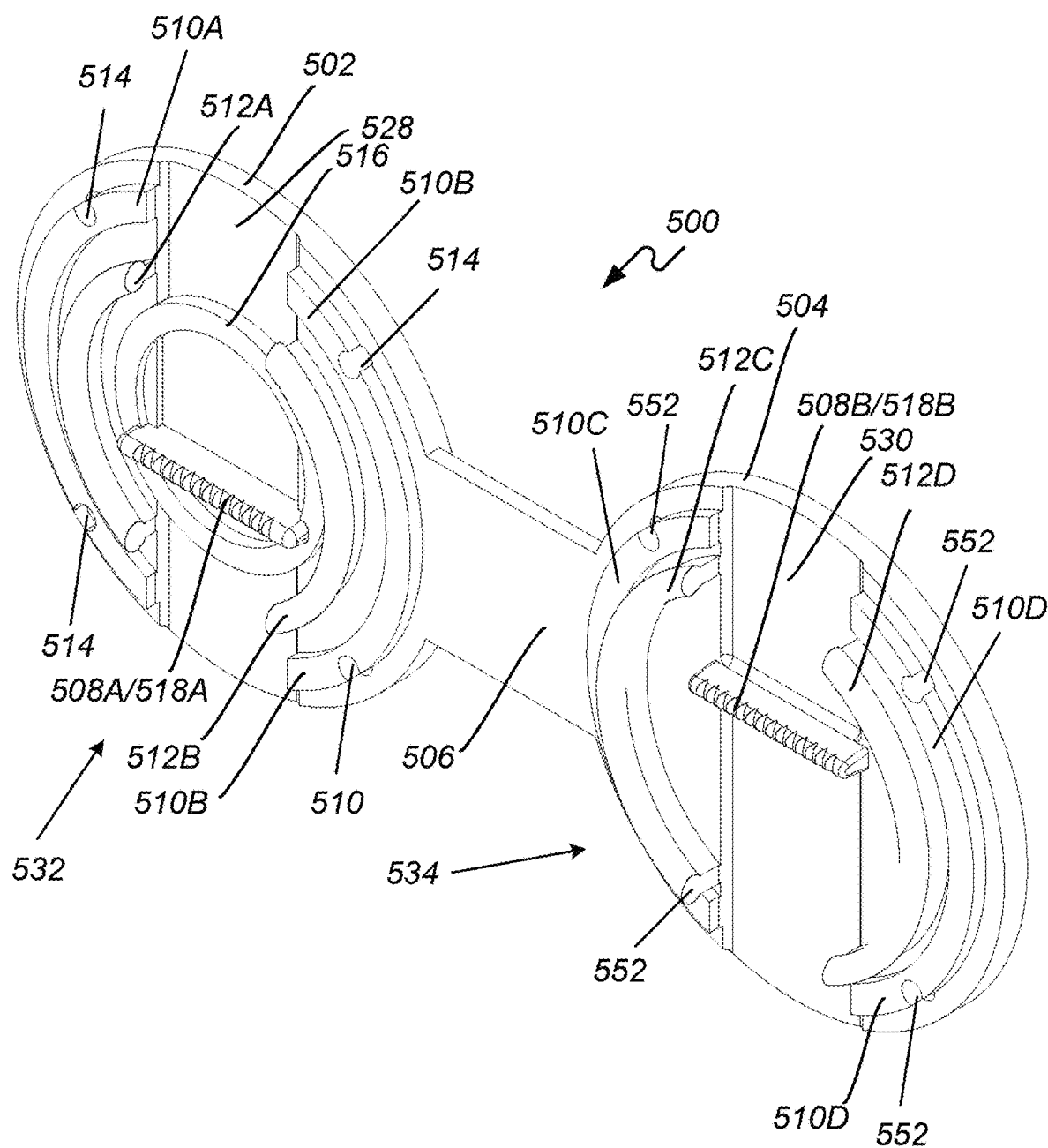
Figure 6:
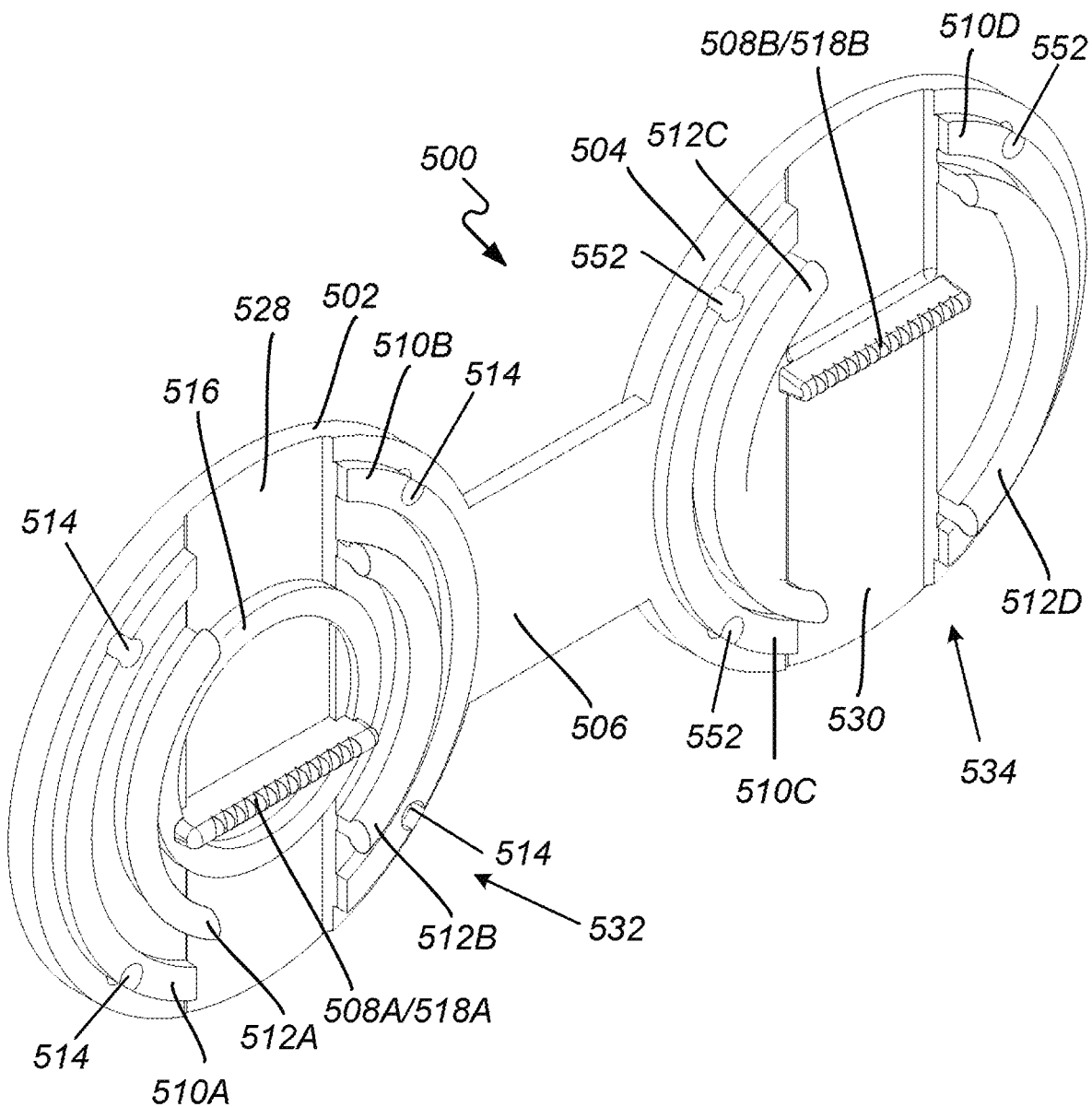
Figure 7:
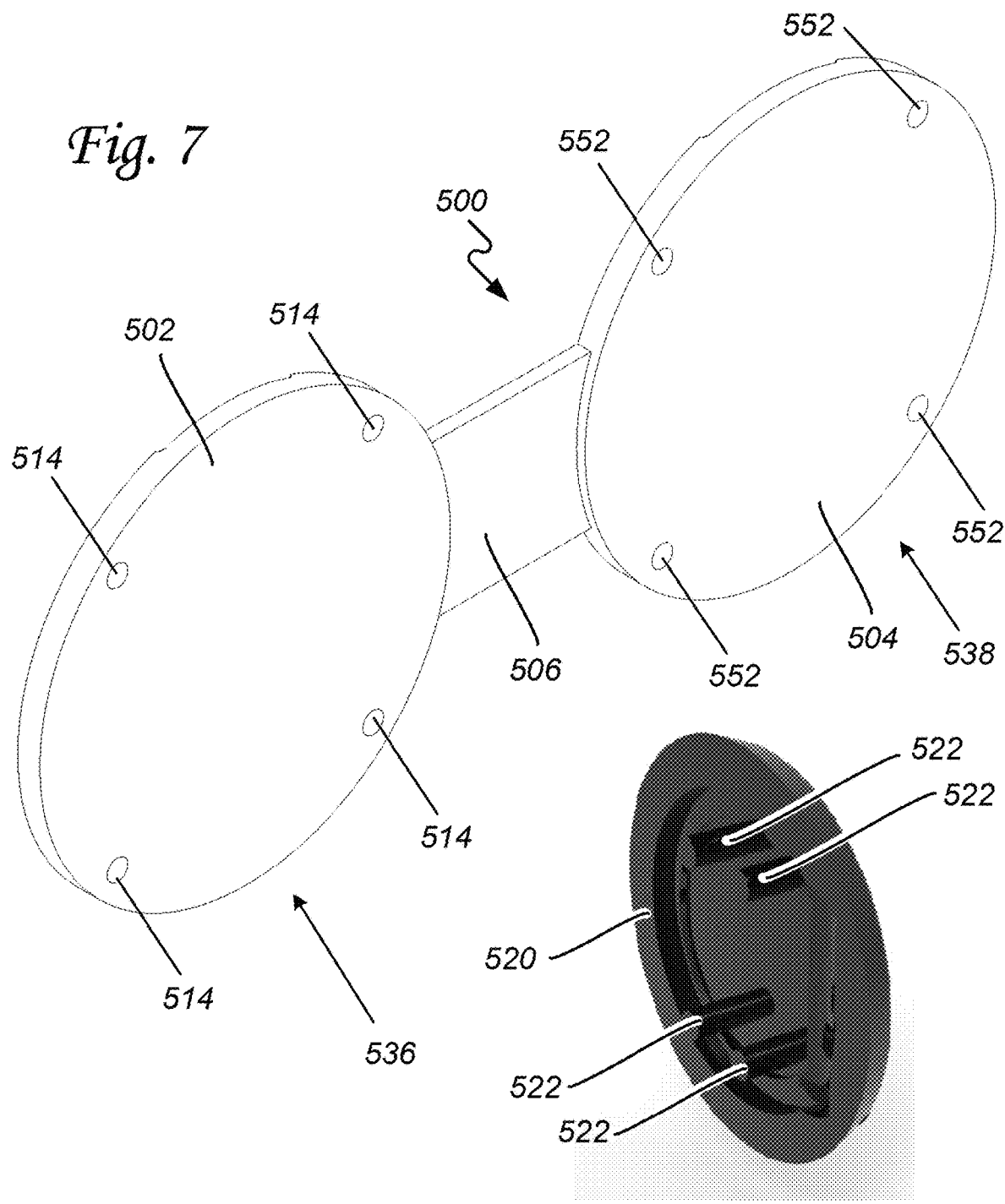
Figure 8:
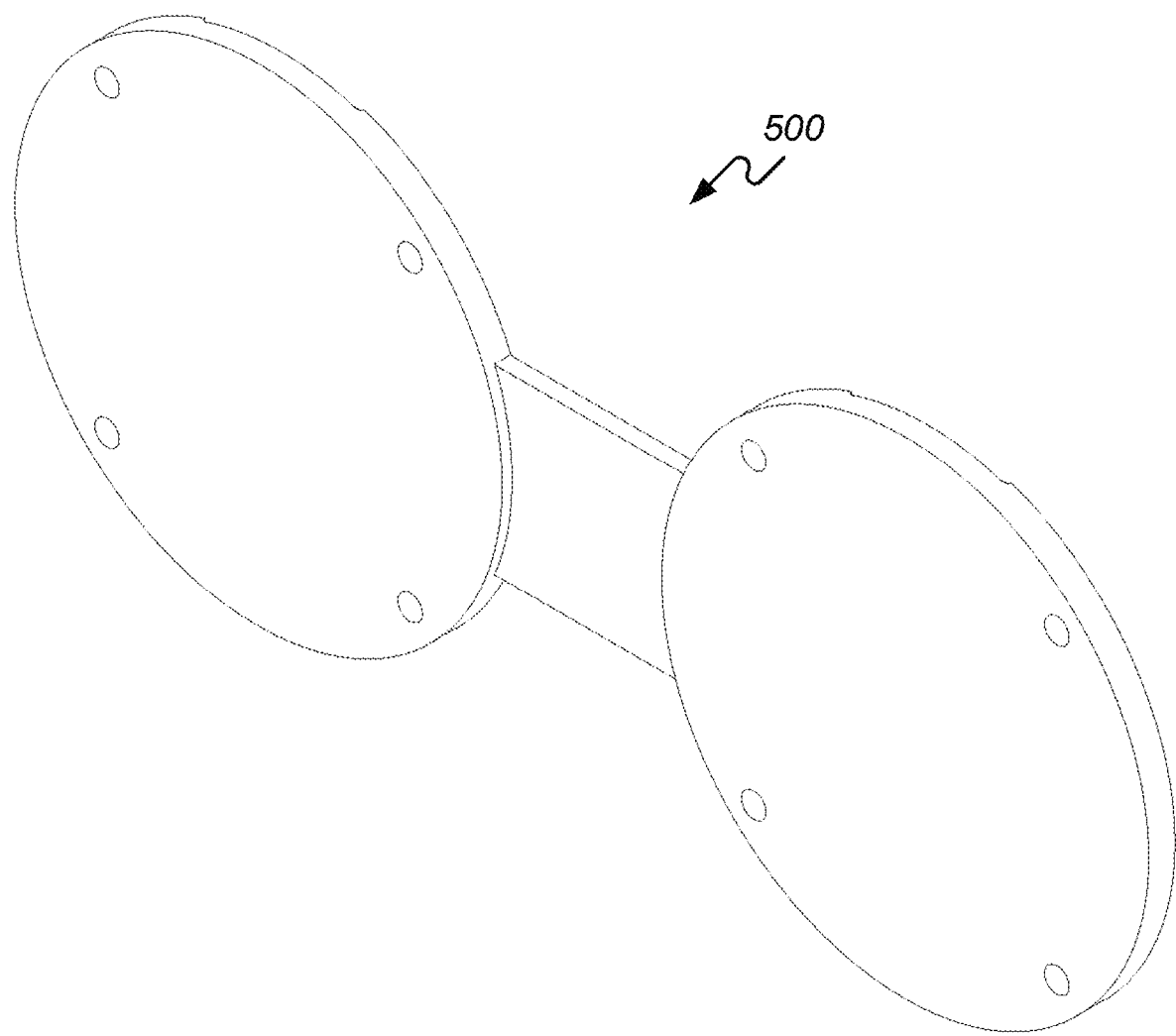
Figure 11:
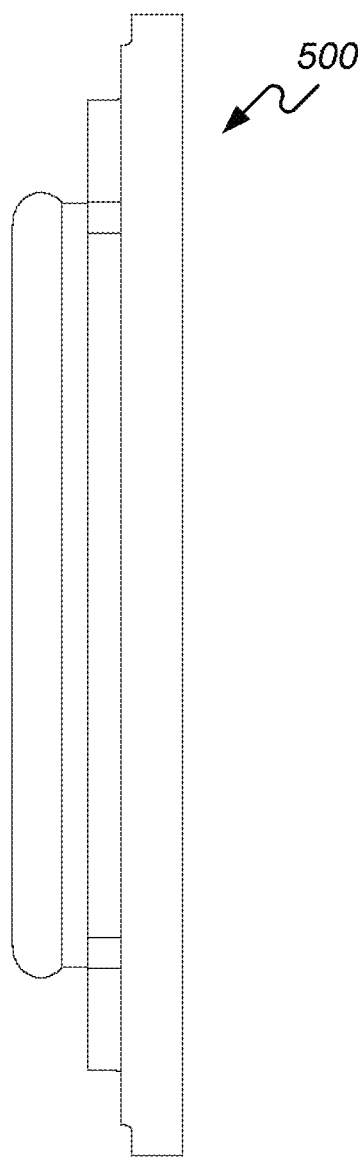
Figure 12:
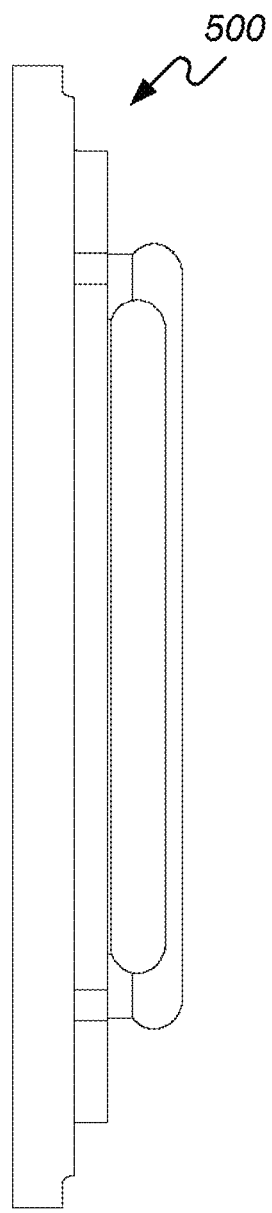
Figure 14:
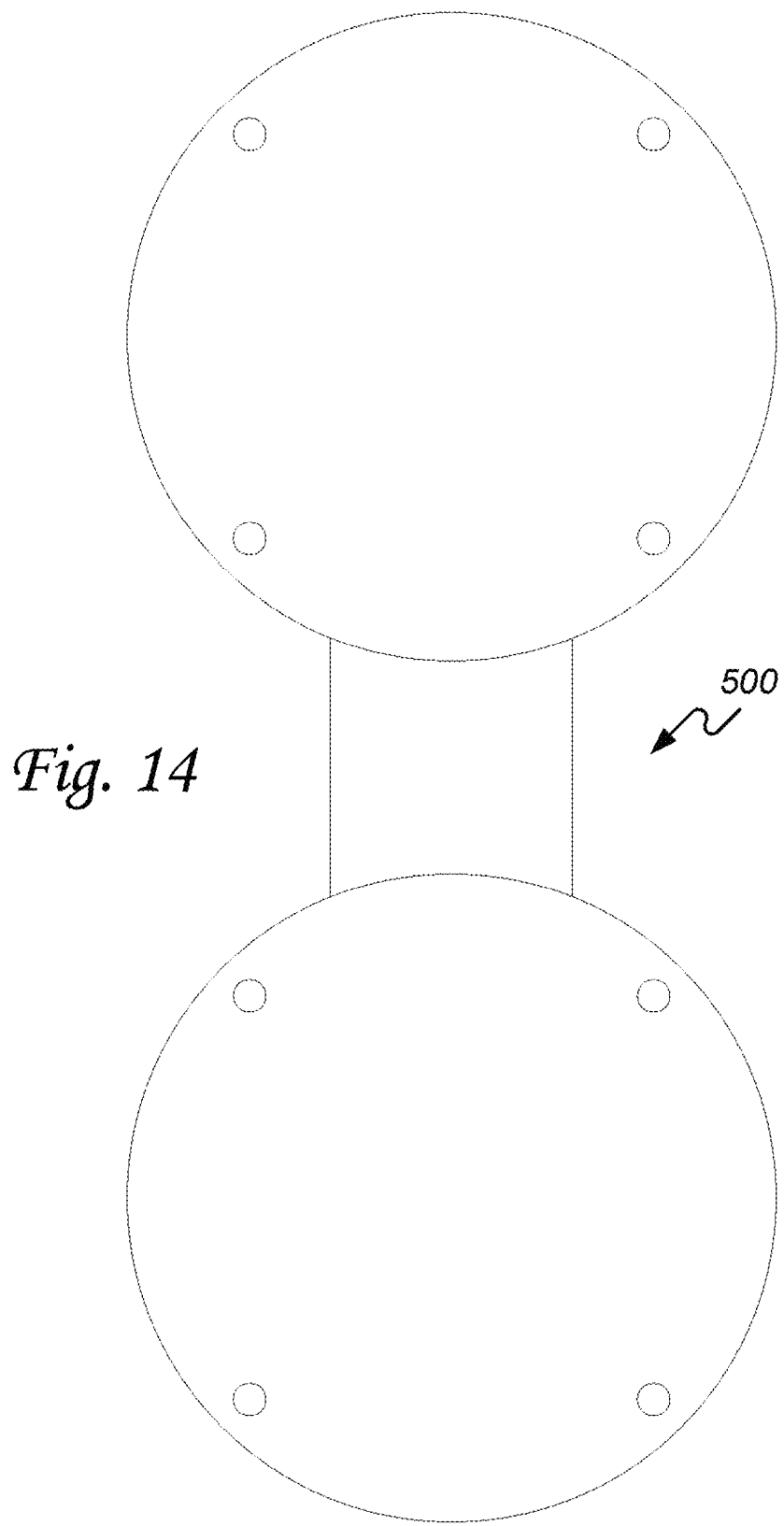

Referring to FIGS. 4-14, there is illustrated one example of a clothing cord clip 500 that folds around one or more clothing cords 304 and press-fits together with emblem mounting holes. FIG. 4 illustrates the clothing cord clip 500 being folded around one or more clothing cords 304. FIGS. 5 and 6 are perspective views of the interior surfaces. FIGS. 7 and 8 are perspective views of the exterior surfaces. FIG. 9 is a left side view and FIG. 10 is a right side view. FIG. 11 is a bottom side view and FIG. 12 is a top side view. FIG. 13 is a back side view showing the interior surface, and FIG. 14 is the front view showing the exterior surface.

FIG. 4 illustrates in reference 'A' the clothing cord clip 500 in the open position. Reference 'B' illustrates the clothing cord clip 500 being folded 422 around the clothing cords 304. Reference 'C' illustrates the clothing cord clip 500 press fit together with the clothing cords secured inside such that the clothing cord clip 500 can hang from the clothing cords 304.

In an exemplary embodiment and as better illustrated in at least FIG. 9, a clothing cord clip 500 can comprise a front plate 502 that has a first exterior surface 536 and a first interior surface 532. With reference to at least FIGS. 4-6, the first interior surface 532 can comprise at least one of a first gripping rail 508A, a pinch ring 516 positioned around the first gripping rail 508A, more than one first curvilinear locking ribs 512A-B positioned around the pinch ring 516, and more than one first raised support ribs 510A-B positioned around the first curvilinear locking rib 512A-B.

In an exemplary embodiment and with reference to at least FIG. 9, a back plate 504 can have a second exterior surface 538, and a second interior surface 534. With reference to at least FIGS. 4 and 5, the second interior surface 534 can comprise at least one of a second gripping rail 508B, more than one second curvilinear locking rib 512C-D positioned around the second gripping rail 508B, and more than one second raised support rib 510C-D positioned around the second curvilinear locking rib 512C-D.

In an exemplary embodiment and with reference to at least FIG. 4, a flexible connector 506 interconnects the front plate 502 and the back plate 504, allowing the first interior surface 532 and the second interior surface 534 can be positioned opposed, aligned, and press-fitted together, as illustrated in reference 'B' and 'C', by interlocking the first curvilinear locking rib 512A-B and the second curvilinear locking rib 512C-D.

In operation, at least one clothing cord 304 can be positioned between the first gripping rail 508A and the second gripping rail 508B. The clothing cord clip 500 can be folded 422 around the clothing cord 304 securing the clothing cord 304 between the pinch ring 516 and the first gripping rail 508A, the pinch ring 516 and the second gripping rail 508B, the first gripping rail 508A and the second interior surface 534, and the second gripping rail 508B and the first interior surface 532.

Referring to FIGS. 5 and 6, there are illustrated perspective views of the first interior surface 532 and the second interior surface 534 of a clothing cord clip 500.

In an example embodiment, the first gripping rail 508A can comprise a first set of teeth 518A formed along the edge that contacts the clothing cord 304, and the second gripping rail comprises a second set of teeth 518B formed along the edge that contacts the clothing cord 304.

In an exemplary embodiment and referring to at least FIGS. 10 and 13, the front plate 502 can comprise a first recess channel 528 that traverses the central portion of the first interior surface 532 and the back plate 504 can comprise a second recess channel 530 that traverses the central portion of the second interior surface 534. In operation, when the front plate 502 and the back plate 504 are interlocked together the first recess channel 528 and the second recess channel 530 are opposed and aligned creating an ingress and egress pathway for the clothing cord 304, through the clothing cord clip 500.

In an exemplary embodiment and with reference to at least FIG. 13, each of the first curvilinear locking ribs 512A-B and the first curvilinear support rails 510A-B begin and end at a first boundary edge 524 of the first recess 528, and each of the second curvilinear locking ribs 512C-D and the second curvilinear support rails 510C-D begin and end at a second boundary edge 526 of the second recess 530.

In an exemplary embodiment, the first gripping rail 508A runs perpendicular to and extends beyond 426 the first recess channel 524 (length 428), and the second gripping rail 508B runs perpendicular to and extends beyond 430 the second recess channel 530 (length 432).

In an exemplary embodiment and with reference to at least FIG. 1 reference 'C', when the front plate 502 and the back plate 504 are interlocked together the first curvilinear support rail 510A and the second curvilinear support rail 510B are opposed, aligned, and contact each other establishing a fixed distance 434 between the front plate and the back plate In an exemplary embodiment and with reference to at least FIG. 7, at least one emblem 520 can be affixed to at least one of the first exterior surface 536 of the front plate 502, or the second exterior surface 538 of the back plate 504.

In another exemplary embodiment, the front plate 502 can have at least one first emblem mounting hole 514 therethrough, and the back plate 504 can have more than one second emblem mounting hole 552 therethrough.

Each of the first emblem mounting holes 514 can be positioned to intersect the first raised support rib 510A-B, and each of the second emblem mounting holes 552 can be positioned to intersect the second raised support rib 510C-B. In this regard, providing more of a gripping contact surface for the peg legs 522 to engage when the emblem is attached to the front plate 502 or the back plate 504.

In operation, the emblem 520 can comprise at least one peg leg 522. The peg legs 522 can be fitted through the first emblem mounting holes 514 to secure the emblem to the first exterior surface 536 of the front plate 502, or the peg legs 522 can be fitted through the second emblem mounting holes 552 to secure the emblem 520 to the second exterior surface 538 of the back plate 504, as may be required and/or desired in a particular embodiment.

In an exemplary embodiment, a clothing cord clip 500 can comprise a front plate 502 that has a first exterior surface 536 and a first interior surface 532. The first interior surface 532 can comprise at least one first gripping rail 508A, a pinch ring 516 positioned around the first gripping rail 508A, more than one of a first curvilinear locking rib 512A-B positioned around the pinch ring 516, more than one of a first raised support rib 510 A-B positioned around the first curvilinear locking rib 512A-B, and a first recess channel 528 that traverses the first interior surface 532.

A back plate has a second exterior surface 538 and a second interior surface 534. The second interior surface 534 can comprise at least one second gripping rail 508B, more than one second curvilinear locking rib 512C-D positioned around the second gripping rail 508B, more than one second raised support rib 510C-D positioned around the second curvilinear locking rib 512C-D, and a second recess channel 530 that traverses the second interior surface 534.

A flexible connector 506 interconnects the front plate 502 and the back plate 504, The flexible connector 506 can be bent 422 allowing the first interior surface 532 and the second interior surface 534 to be opposed, aligned, and press-fitted together by interlocking the first curvilinear locking rib 512A-B and the second curvilinear locking rib 512C-D.

In operation and better illustrated in at least FIG. 4, when the front plate 502 and the back plate 504 are interlocked together the first recess channel 528 and the second recess channel 530 are opposed and aligned, creating an ingress and egress pathway for the clothing cord 304, through the clothing cord clip.

At least one clothing cord can be positioned through the first channel recess 528 and the second channel recess 530 and between the first gripping rail 508A and the second gripping rail 508B. The clothing cord can be secured between the pinch ring 516 and the first gripping rail 508A, the pinch ring 516 and the second gripping rail 508B, the first gripping rail 508A and the second interior surface 530, and the second gripping rail 508B and the first interior surface 528.

Figure 15:
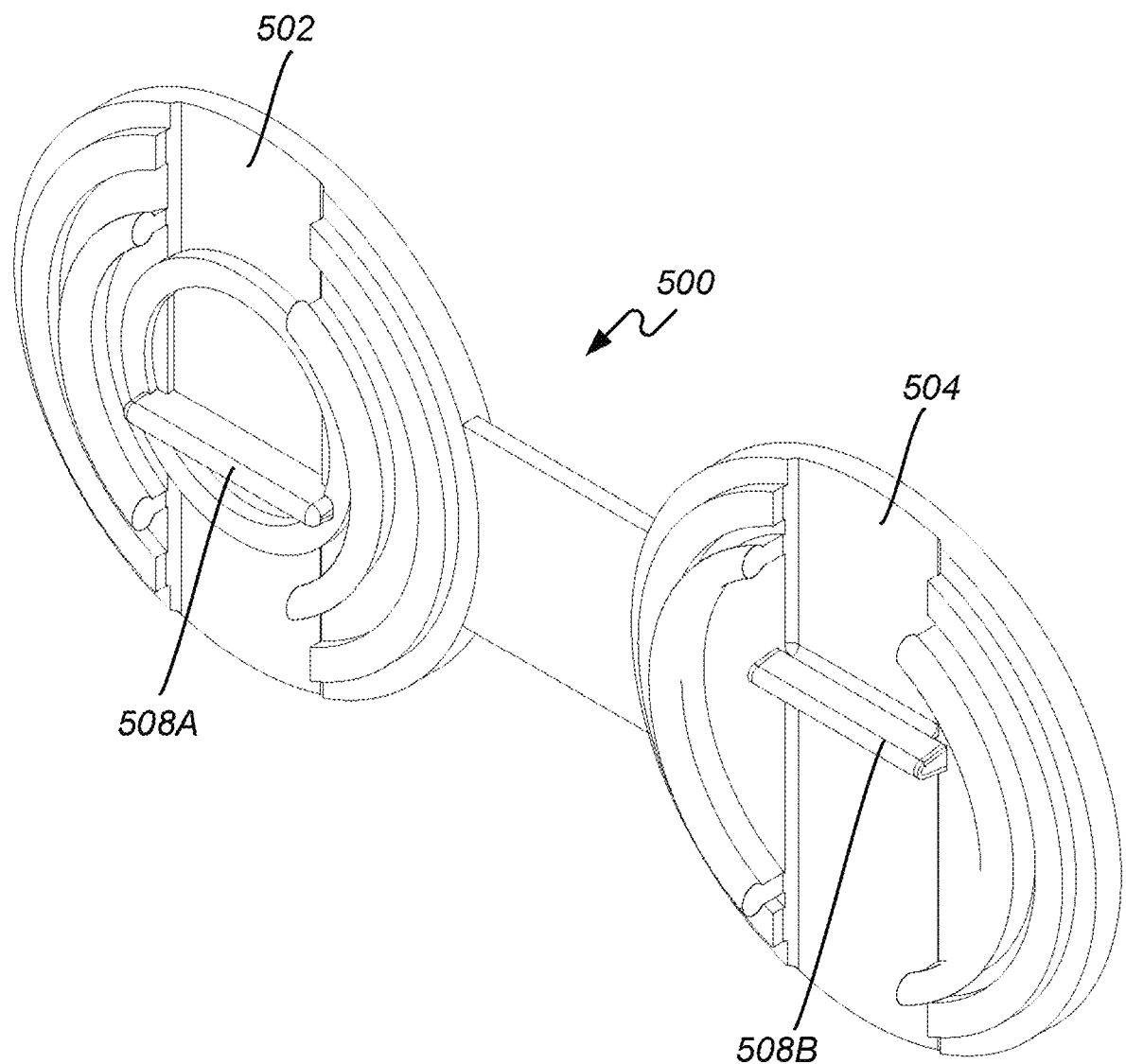
FIGS. 15-24 illustrate one example of a clothing cord clip that folds together without emblem mounting holes.
Figure 16:
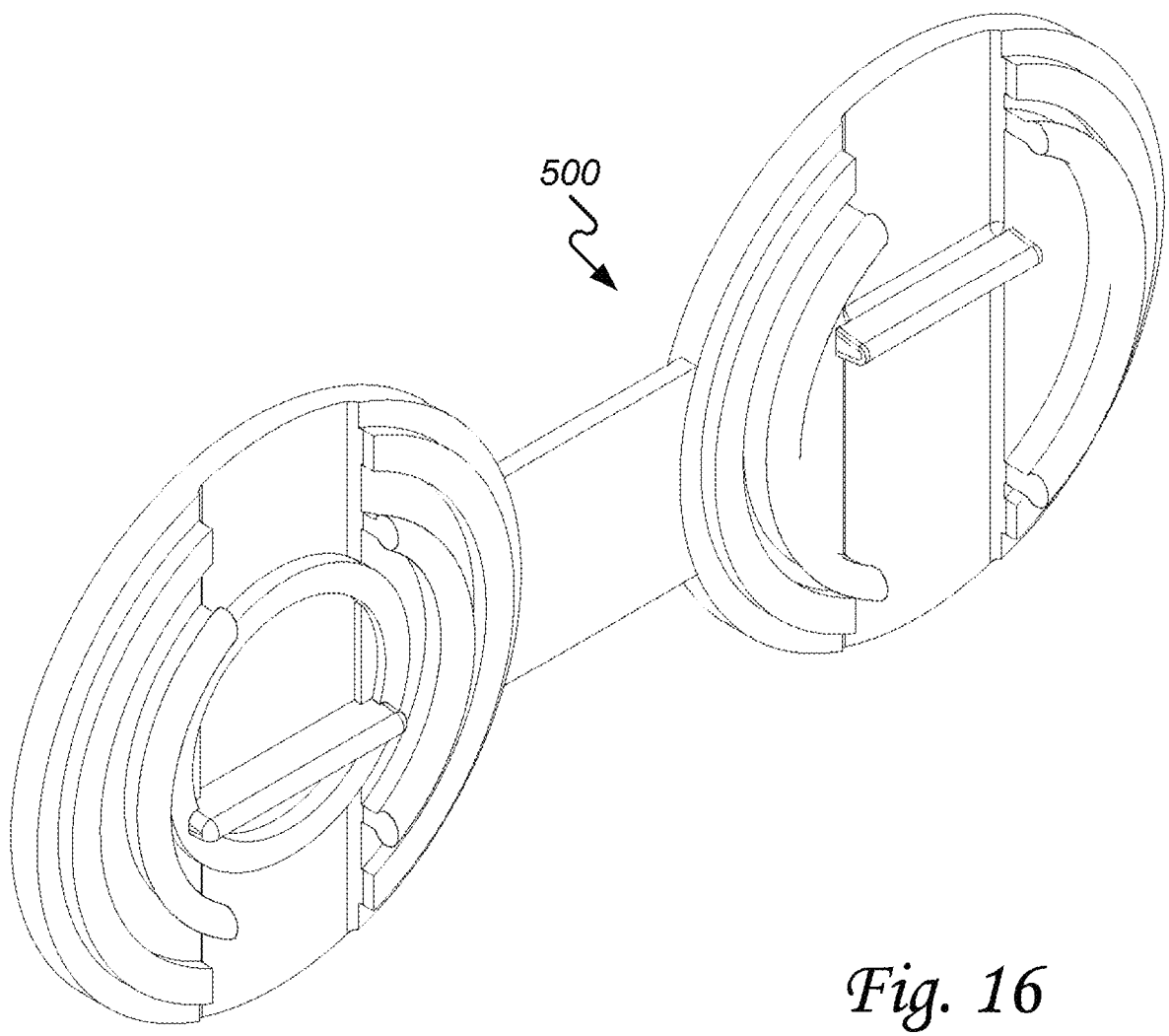
Figure 17:
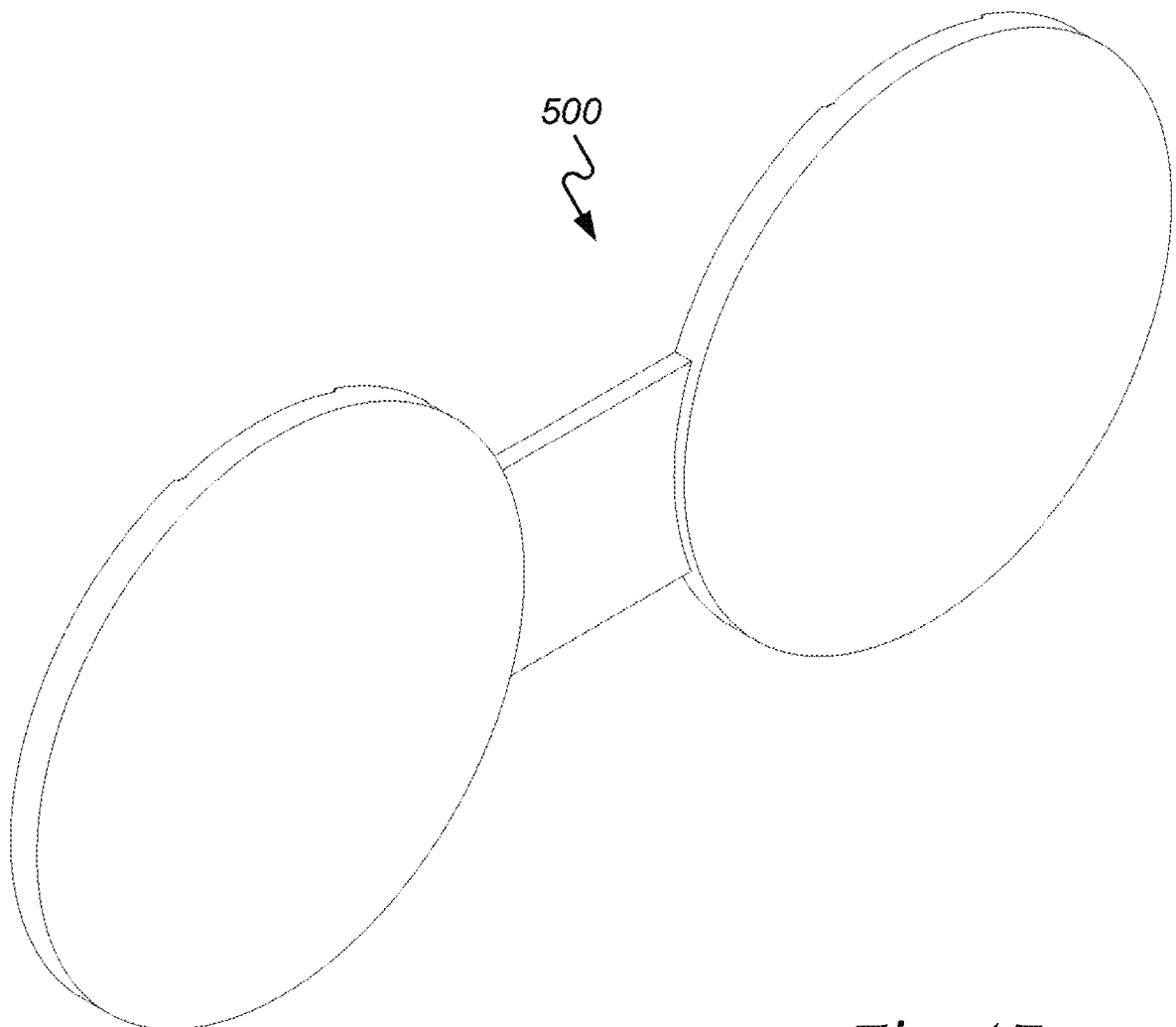
Figure 18:
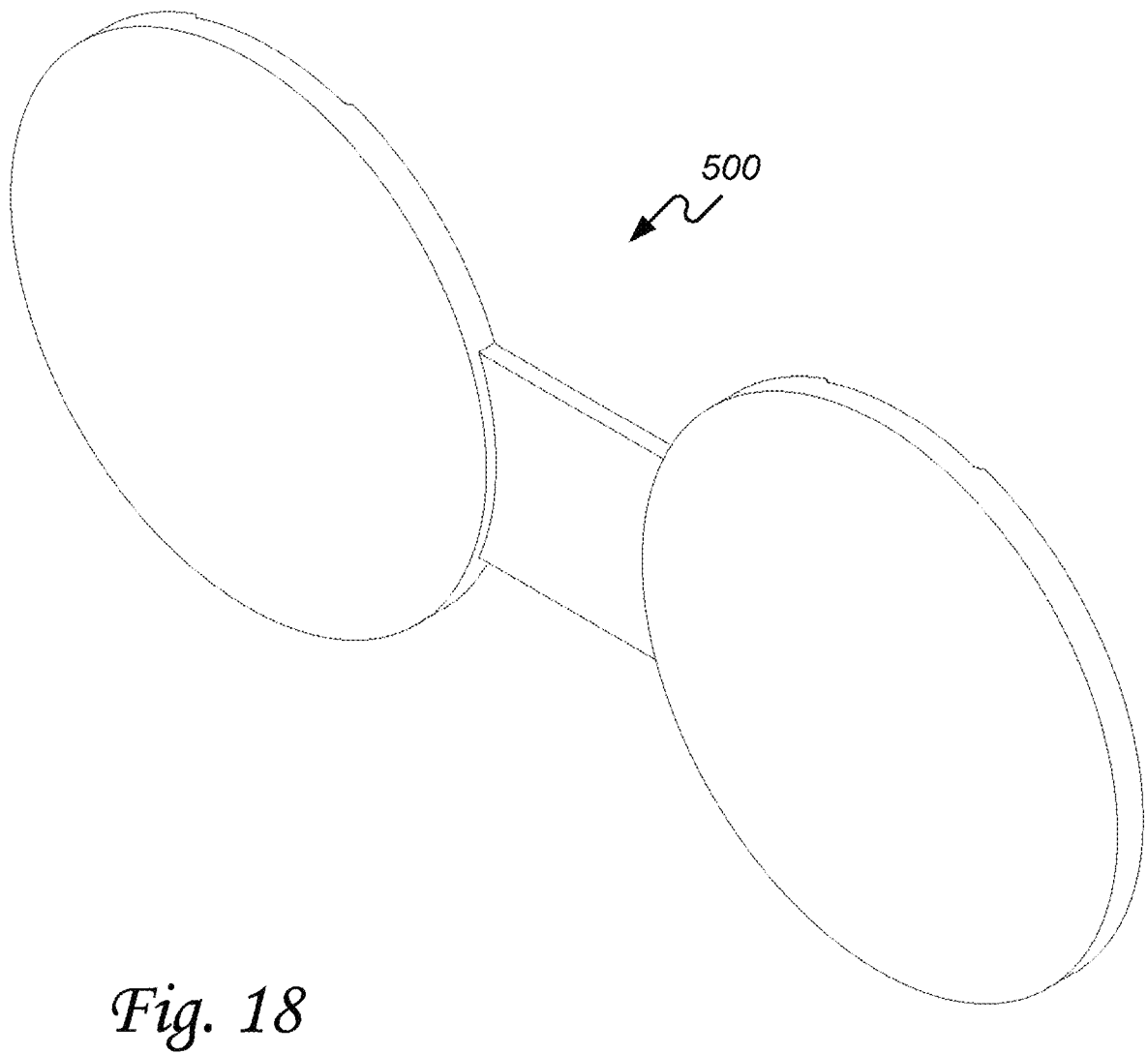
Figures 19, 20:
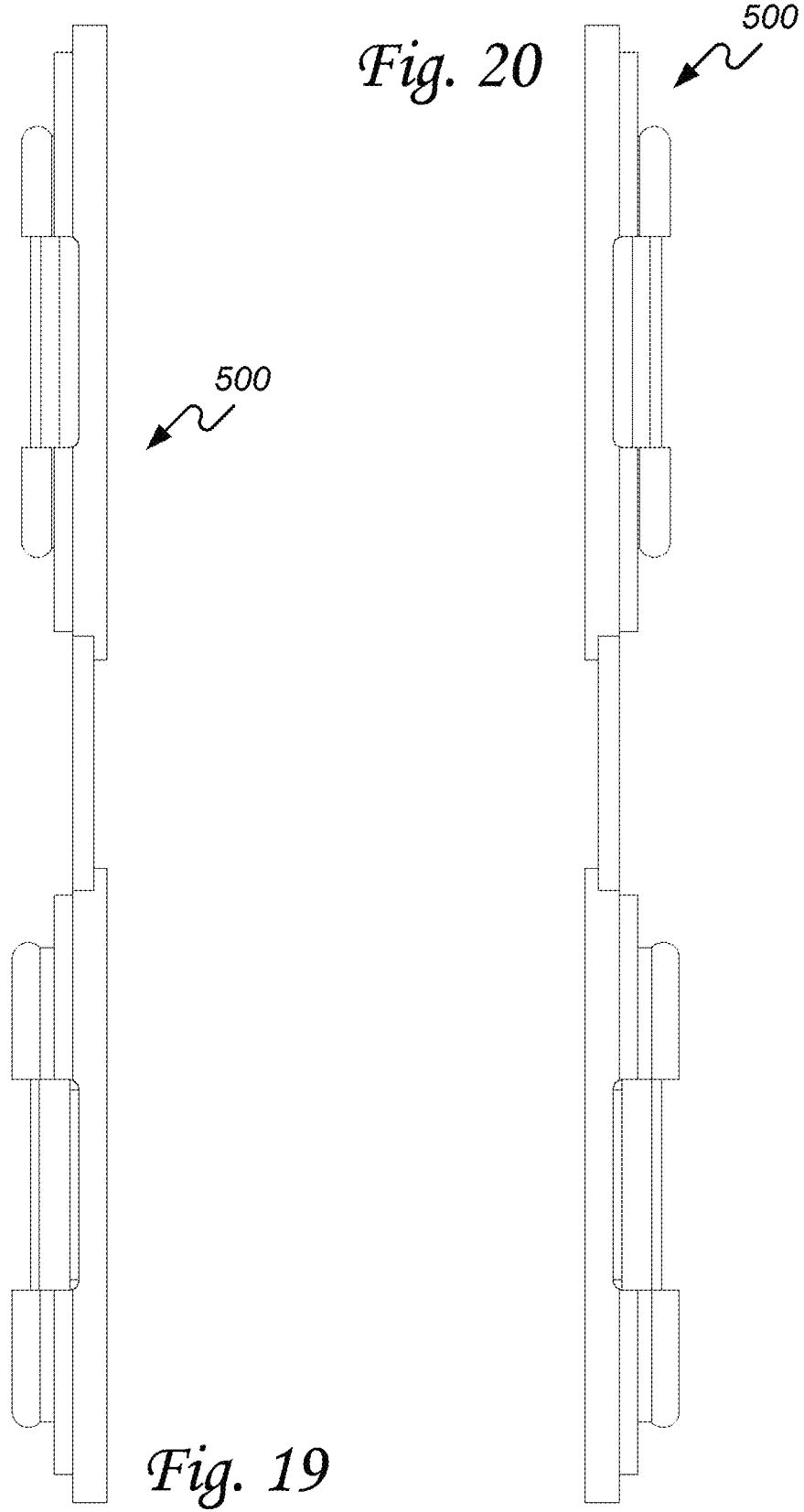
Figure 21:
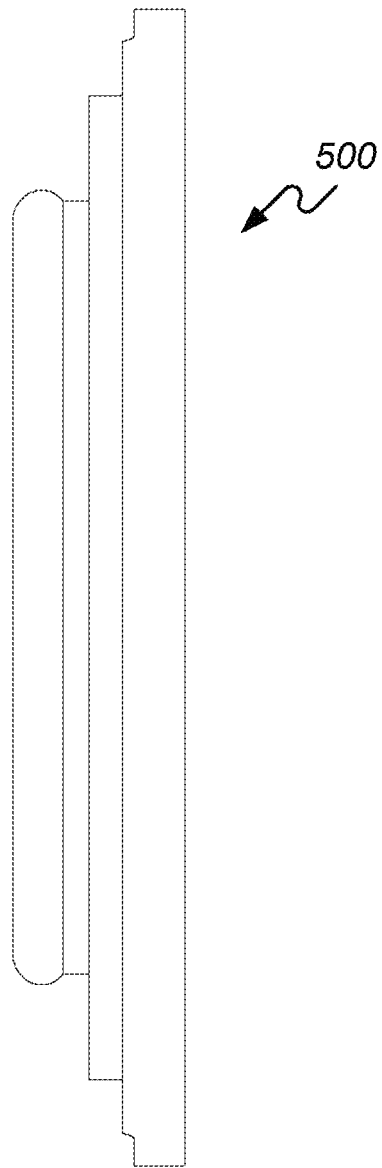
Figure 22:
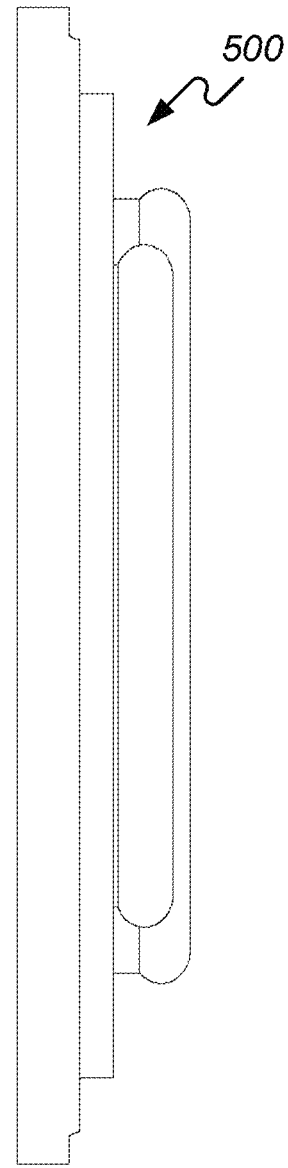
Figure 23:
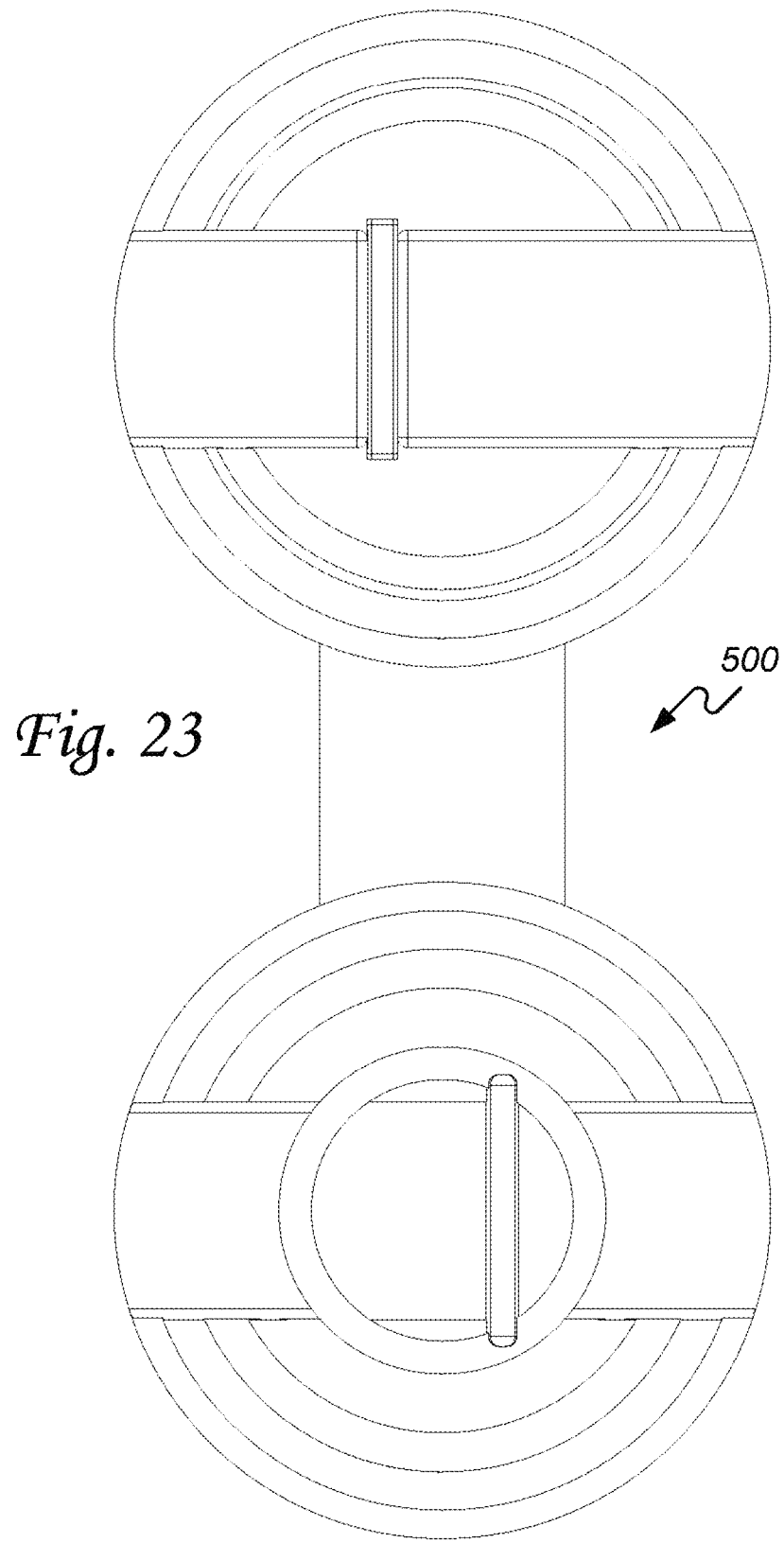
Figure 24:
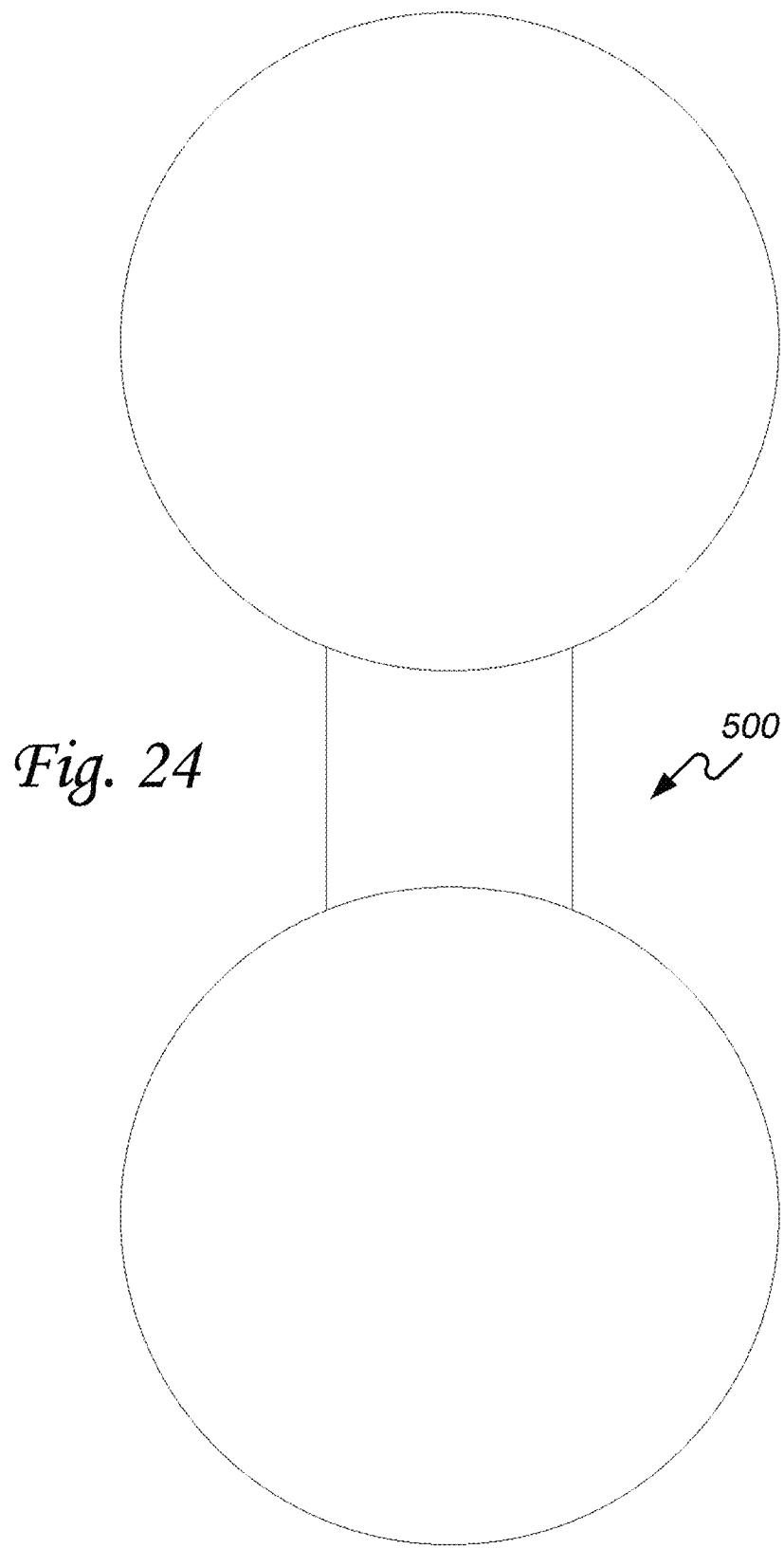

Referring to FIGS. 15-24, there is illustrated one example of a clothing cord clip 500 that folds 422 around one or more clothing cords 304 and press fits. In an exemplary embodiment, the clothing cord clip 500 illustrated in FIGS. 15-24 is absent the emblem mounting holes 514/552 and the set of teeth 518A-B along the gripping rails 508A-B. FIGS. 15 and 16 are perspective views of the interior surfaces. FIGS. 17 and 18 are perspective views of the exterior surfaces. FIG. 19 is a left side view and FIG. 20 is a right side view. FIG. 21 is a bottom side view and FIG. 22 is a top side view. FIG. 23 is a back side view showing the interior surface, and FIG. 24 is the front view showing the exterior surface.

In an exemplary embodiment, a clothing cord clip 500 can comprise a front plate 502 that has a first exterior surface 536 and a first interior surface 532. The first interior surface 532 can comprise at least one first gripping rail 508A, a pinch ring 516 positioned around the first gripping rail 508A, more than one first curvilinear locking rib 512A-B positioned around the pinch ring 516, and more than one first raised support rib 510A-B positioned around the first curvilinear locking ribs 512A-B. A back plate 504 can have a second exterior surface 538 and a second interior surface 534. The second interior surface 534 can comprise at least one second gripping rail 508B, more than one second curvilinear locking rib 512C-D positioned around the second gripping rail 508B, and more than one second raised support rib 510C-D positioned around the second curvilinear locking rib 512C-D. A flexible connector 506 can interconnect the front plate 502 and the back plate 506, allowing the first interior surface 532 and the second interior surface 534 to be opposed, aligned, and press-fitted together by interlocking the first curvilinear locking rib 512A-B and the second curvilinear locking rib 512C-D. At least one emblem 520 can be snap fitted or otherwise fastened, in a permanent or a removable manner, to at least one of the first exterior surface 532 or the second exterior surface 534.

In operation, at least one clothing cord 304 can be positioned between the first gripping rail 508A and the second gripping rail 508B. The clothing cord 304 can be secured between the pinch ring 516 and the first gripping rail 508A, the pinch ring 516 and the second gripping rail 508B, the first gripping rail 508A and the second interior surface 534, and the second gripping rail 508B and the first interior surface 532.

Figure 25:
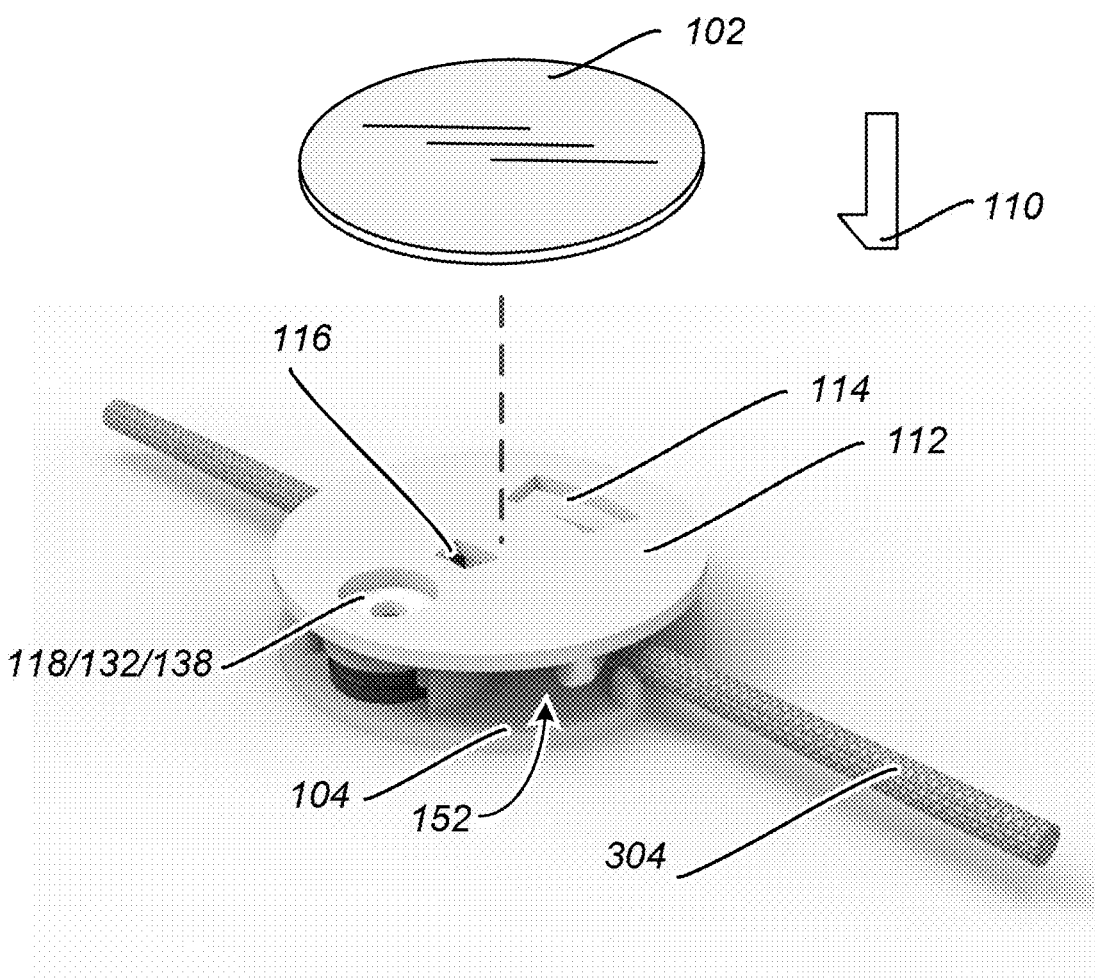
FIGS. 25-26 illustrate one example of a perspective view of a clothing string clip in the closed or locked position around a clothing string.

Referring to FIG. 25 there is illustrated one example of a perspective view of a clothing string clip 100 in the closed or locked position around a clothing string 304. In an exemplary embodiment, user 202 can pivot 404 the rotatable hub 118/132/136 opening the front plate 112 with respect to the back plate 104, as better illustrated in at least FIG. 27. In the open position, a portion of the interior region 152 is exposed including at least the contoured clothing string recessed channels 126/160/164/172 which are better illustrated in at least FIGS. 30 and 31. Once opened user 202 can insert a clothing string 304 across the contoured clothing string recessed channels 126/160/164/172 and into the clothing string channel 166.

In an exemplary embodiment, the rotatable hub is formed by the assembly of fastener 118, spring 132, and insert 136 along with the front plate 112 and the back plate 104. This assembly is better illustrated in at least FIG. 29. For disclosure purposes, the rotatable hub can be referred to as rotatable hub 118/132/136. In operation, spring 132 tightens when the rotatable hub 118/132/136 is pivoted open by the user and the spring aids in applying a rotational force to pivot the rotatable hub 118/132/136 closed when released by the user aligning the front plate 112 with the back plate 104.

With reference to FIG. 25, as user 202 releases the top plate 112 the spring 132 pivots the rotatable hub 118/132/136, aligning the top plate 112 and the back plate 104 closed. In the closed position, the clothing string clip 100 constricts and friction grips the clothing string 304 within the contoured clothing string recessed channels 126/160/164/172 and clothing string channel 166, abating slipping of the clothing string clip 100 along the clothing string 304 during use, such as wearing, by user 202.

The term "friction grip", in the present invention, is intended to mean two or more surfaces pressed close together with the clothing string 304 therebetween. The action of pinching increases the friction and creates a grip between the contacting surfaces and the clothing spring 304. This can be referred to as a friction grip. In the present invention, an exemplary embodiment of friction grip can be when the clothing string clip 100 constricts and friction grips the clothing string 304 between the contacting surfaces which are the contoured clothing string recessed channels 126/160/164/172.

Figure 26:
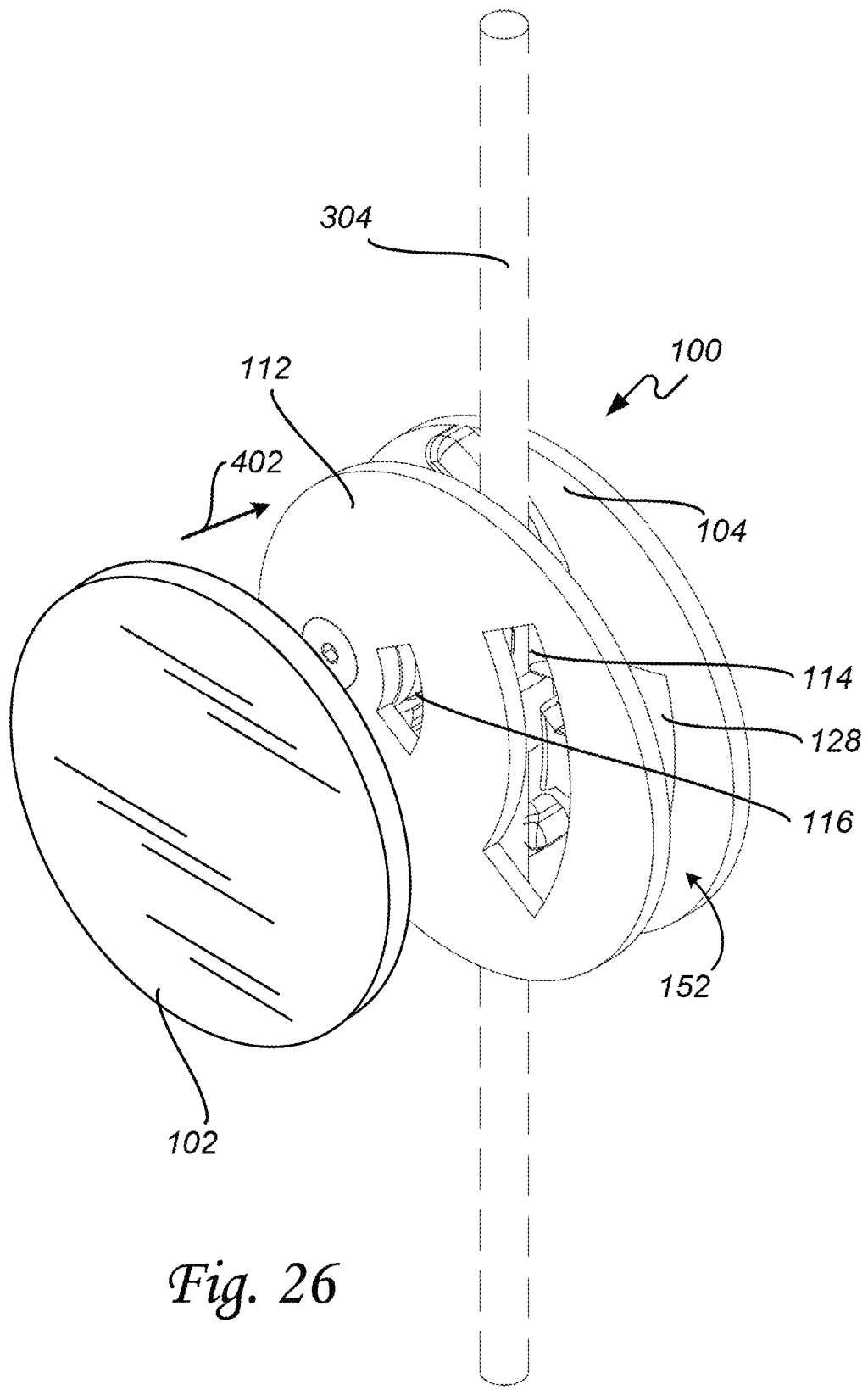

Referring to FIG. 26, there is illustrated one example of a perspective view of a clothing string clip 100 in the closed or locked position around a clothing string 304.

In an exemplary embodiment, an emblem 102 can be secured, fastened, or otherwise interconnected 402 to the outer surface of the front plate 112 by way of the mounting slot 114. The mounting slot 114 can be curvilinear in shape to follow the perimeter of the front plate 112.

In another exemplary embodiment, an emblem 102 can be secured, fastened, or otherwise interconnected 402 to the outer surface of the front plate 112 by way of the mounting slot 114 and an orientation slot 116. The front plate 113 comprises the orientation slot 116. In this regard, orientation slot 116 can better ensure that emblem 102 is connected by at least two points (the mounting slot 114 and the orientation slot 116) and that emblem 102 is orientated correctly on the surface of the front plate 112.

Figure 31:
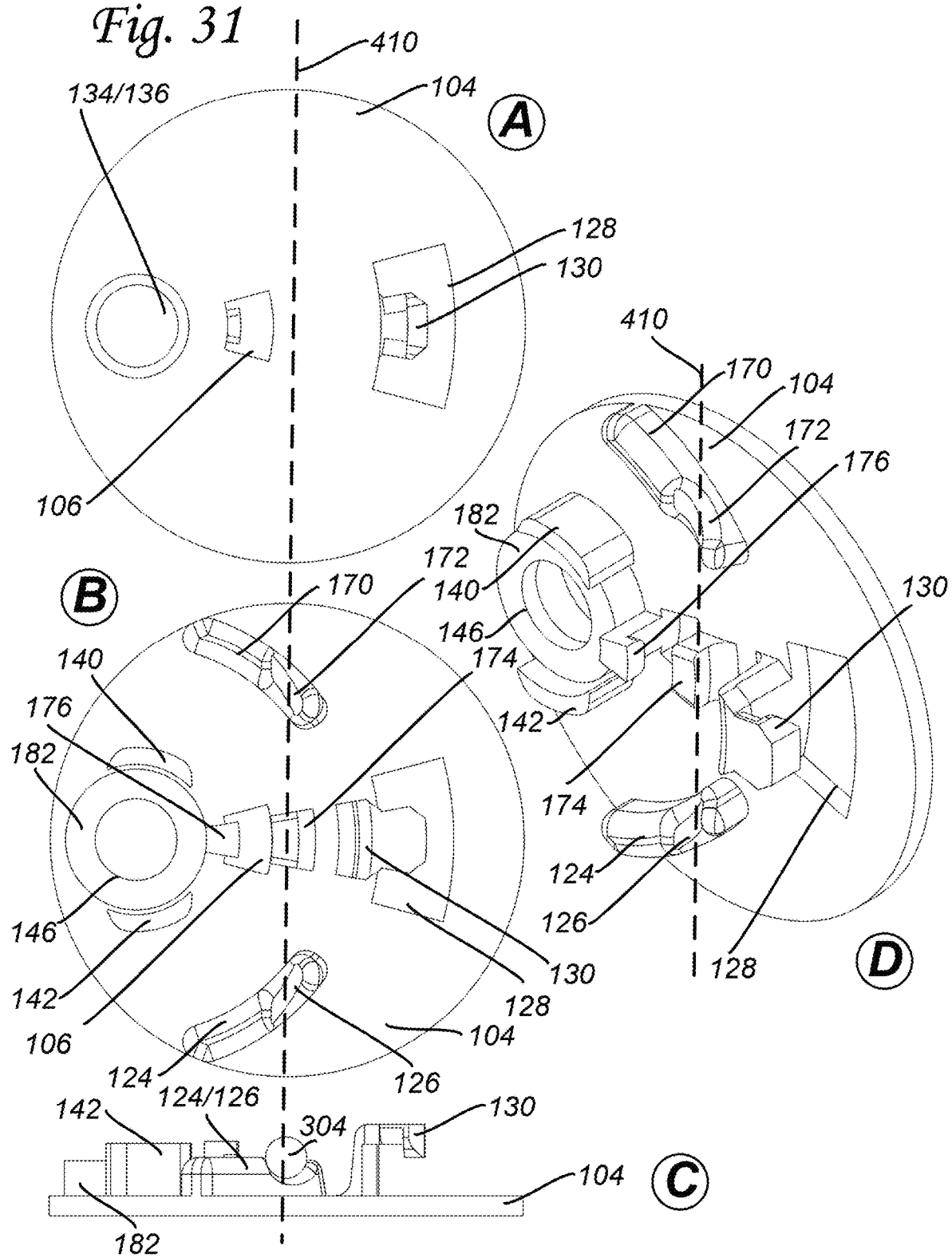
FIG. 31 illustrates one example of a front view, a back view, a bottom view, and a perspective view of a back plate.

In another exemplary embodiment and as better illustrated in at least FIG. 31, the back plate 104 can comprise a back mounting slot 128 where emblem 102 can be secured, fastened, or otherwise interconnected on the back plate 104. The back mounting slot 128 can be curvilinear in shape to follow the perimeter of the back plate 104.

In another exemplary embodiment, the back plate 104 can comprise a back mounting slot 128 and a back orientation slot 106 where emblem 102 can be secured, fastened, or otherwise interconnected on the back plate 104. In this regard, back orientation slot 106 can better ensure that emblem 102 is connected by at least two points (the back mounting slot 128 and the back orientation slot 106) and that emblem 102 is orientated correctly on the surface of the back plate 104.

Figure 27:
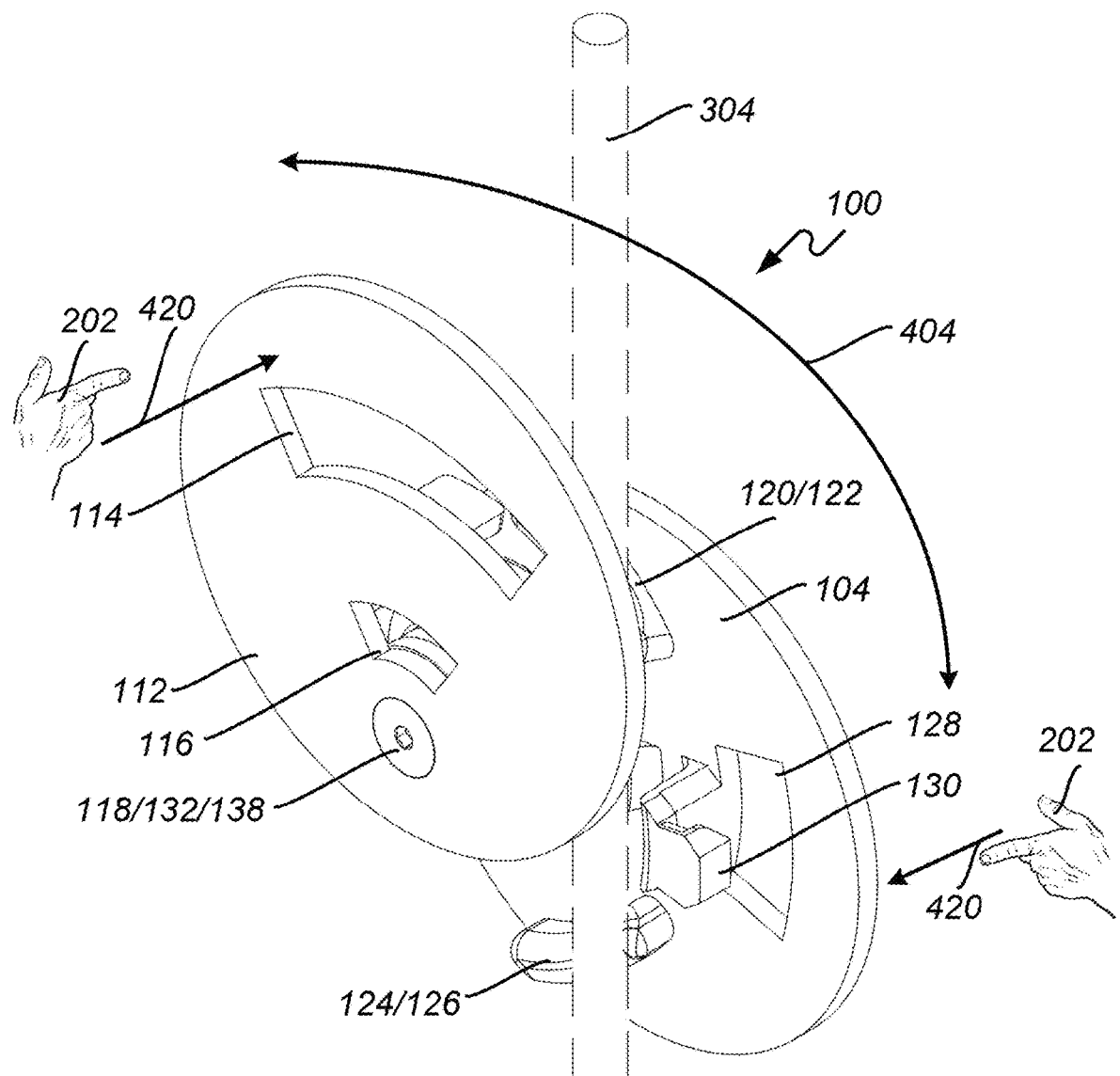
FIG. 27 illustrates one example of a perspective view of a clothing string clip in the open or unlocked position.
Figure 28:
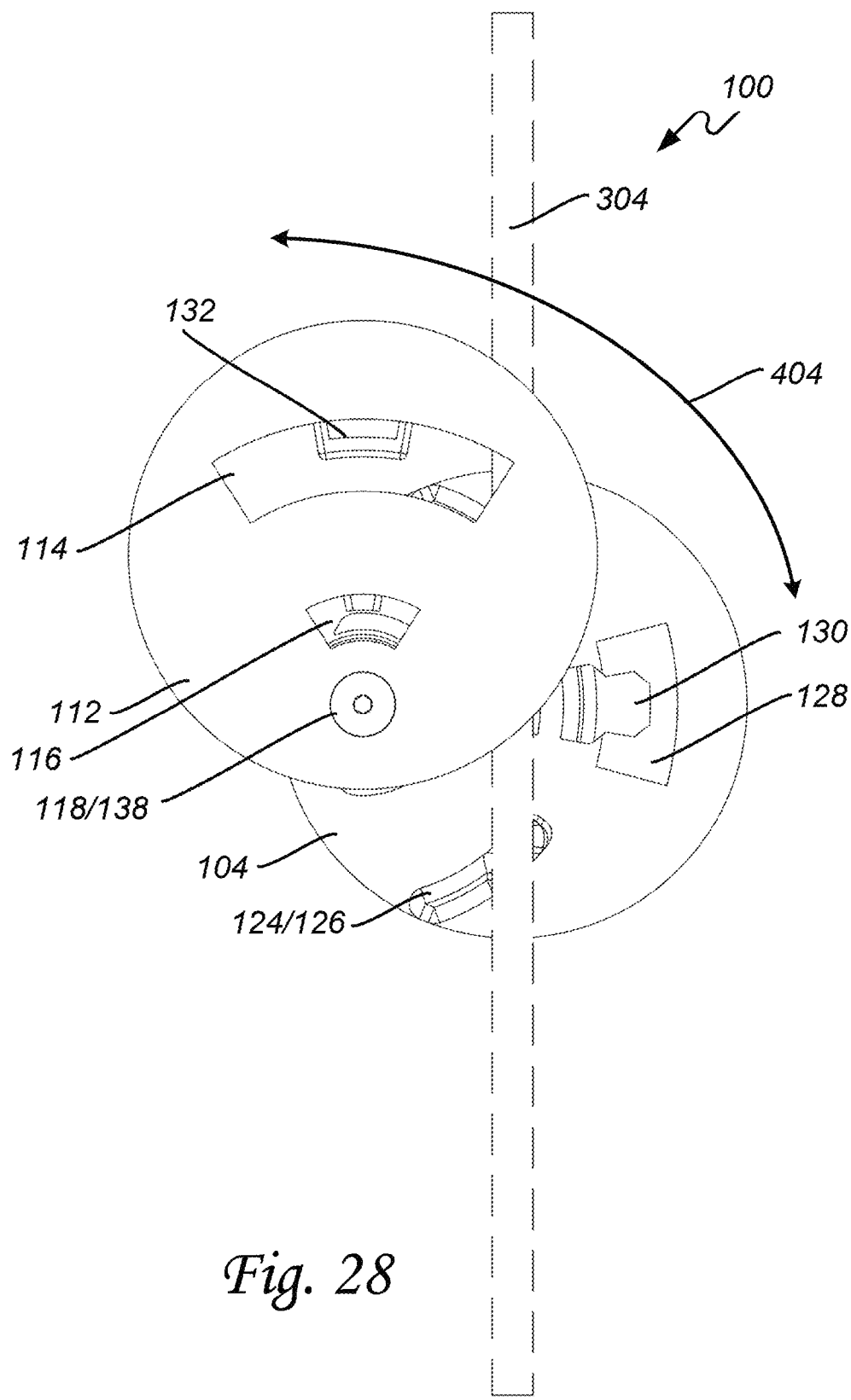
FIG. 28 illustrates one example of a front view of a clothing string clip in the open or unlocked position.

Referring to FIG. 27 there is illustrated one example of a perspective view of a clothing string clip 100 in the open or unlocked position. And, referring to FIG. 28 there is illustrated one example of a front view of a clothing string clip 100 in the open or unlocked position.

Figure 29:
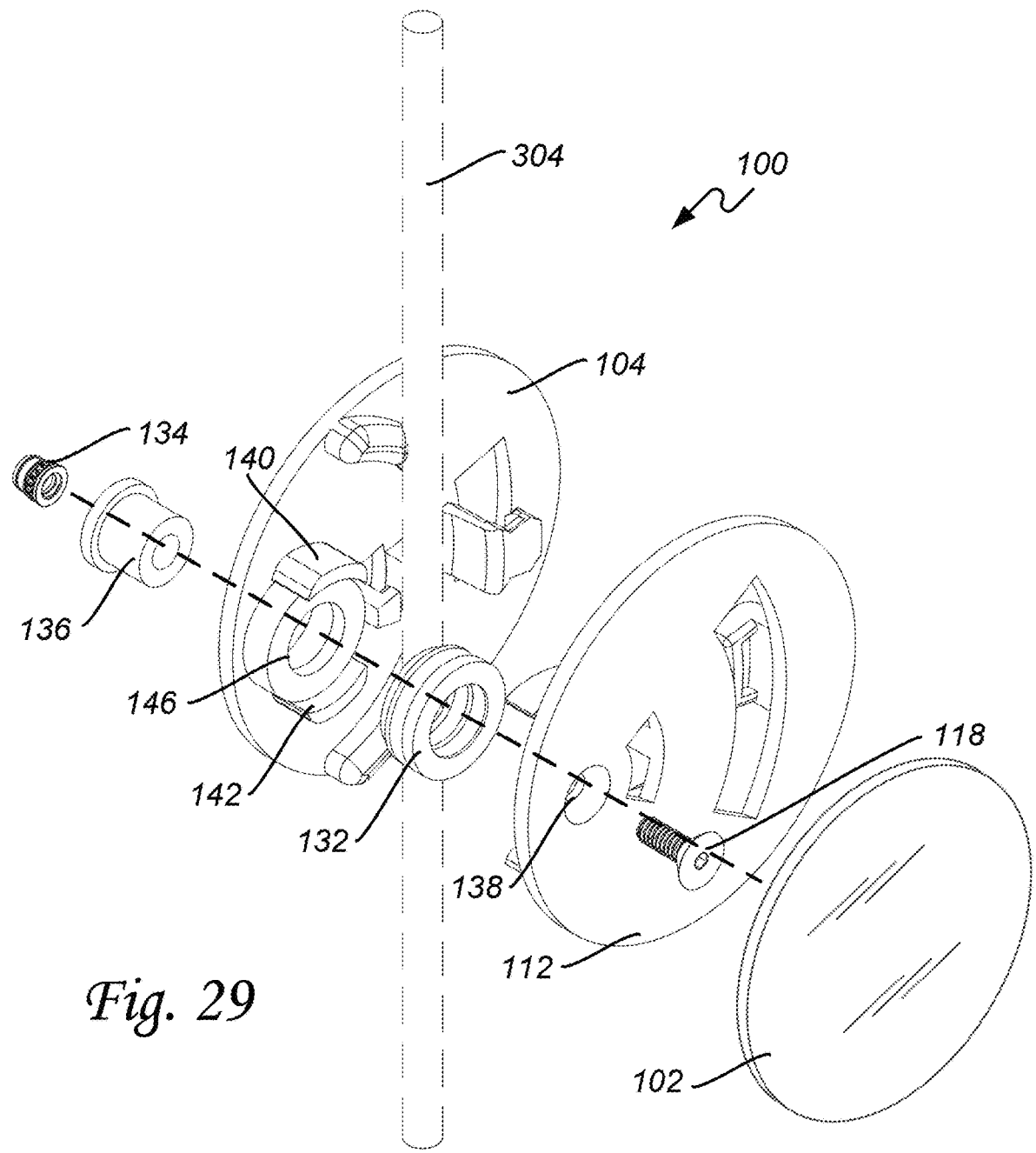
FIG. 29 illustrates one example of a disassembled view of a clothing string clip.

In an exemplary embodiment, the clothing string clip 100 can be opened or otherwise unlocked by way of a user 202 pivoting 404 around the rotatable hub 118/132/136, as better illustrated in at least FIG. 29. The rotatable hub 118/132/136 can be formed by fastener 118 passing through the hub hole 138 on the front plate 112, then insert 136 passes through the back plate 104 insert hole 146, the insert 136 then passes through spring 132 and the assembly secured together by the interconnection of fastener 118 and insert 136. Insert 136 can have a threaded insert 134 to grip the fastener 118. The front plate 112 and back plate 104 are secured together in a manner that allows the front plate 112 to pivot 404 open and closed with respect to the back plate 104 so that user 202 can insert or remove a clothing string 304 from the interior 152 of the clothing string clip 100.

In an exemplary embodiment, fastener 118 can be a screw, rivet, or other suitable fastener as may be required and or desired in a particular embodiment. The insert 136 can be plastic, metal, or other suitable material. The threaded insert 134 can be metal or other suitable material and be pressed or molded into the insert 136 as may be required and/or desired in a particular embodiment.

An advantage, in the present invention, is a press-to-release feature. In this regard, in an exemplary embodiment, when the clothing string clip 100 is in the closed position the front tab 108 and the back tab 130 interlock. To disengage and unlock the front tab 108 and back tab 130 so that the clothing clip 100 can be opened, the user in a press-to-release manner 420 can press the front plate 112 and the back plate 104 closer together while pivoting 404 the front plate 112 with respect to the back plate 104 to open the clothing clip 100 exposing a portion of the interior region 152. Such press-to-release feature in the present invention prevents inadvertent opening of the clothing string clip 100 and also adds a child-proof type of lock feature for safety around young kids.

Figure 30:
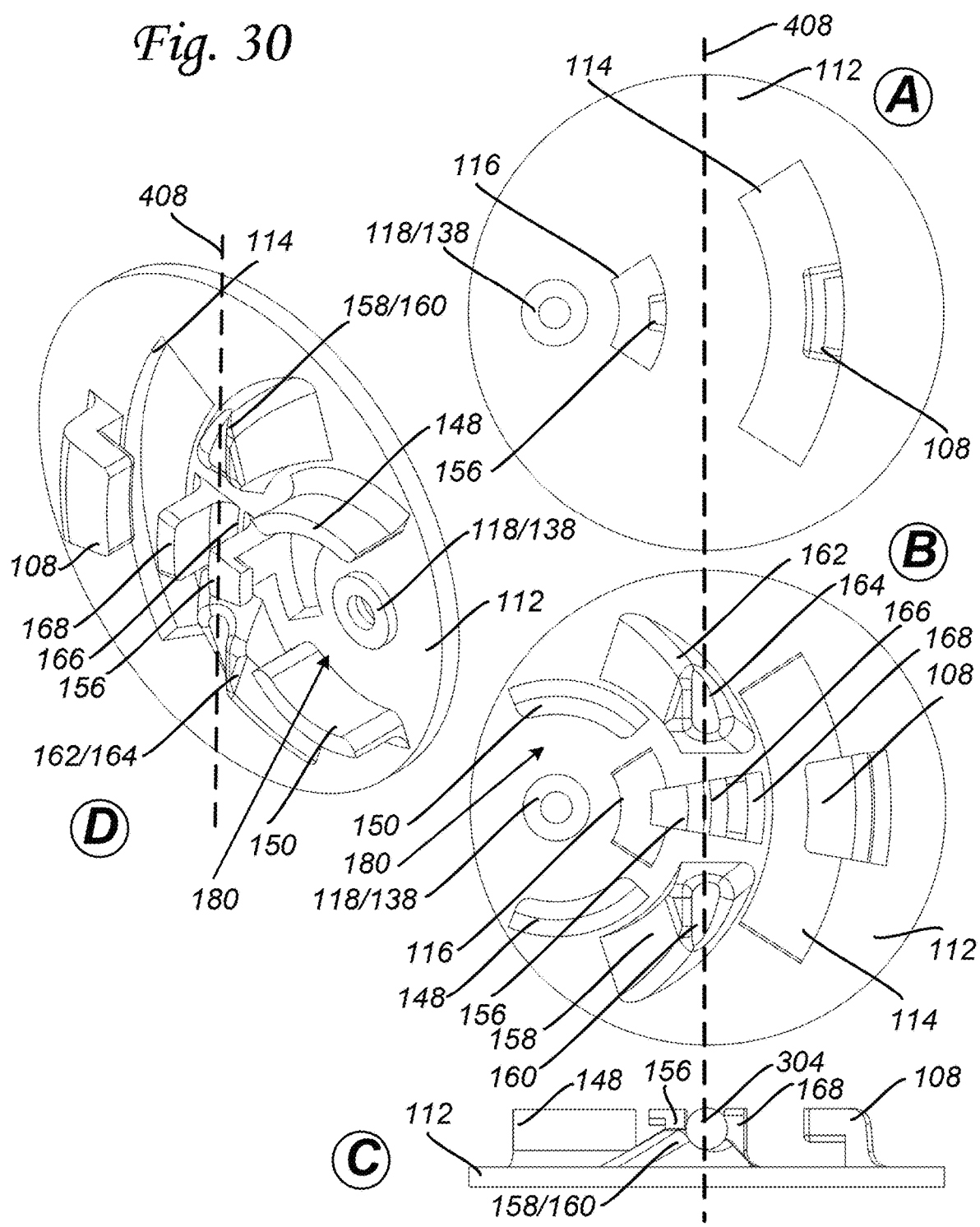
FIG. 30 illustrates one example of a front view, a back view, a bottom view, and a perspective view of a front plate.

Referring to FIG. 29 there is illustrated one example of a disassembled view of a clothing string clip 100. Referring to FIG. 30 there is illustrated one example of a front view in reference 'A', a back view in reference 'B', a bottom view in reference 'C', and a perspective view in reference 'D' of the front plate 112. Referring to FIG. 31 there is illustrated one example of a front view in reference 'A', a back view in reference 'B', a bottom view in reference 'C', and a perspective view in reference 'D' of the back plate 104.

In an exemplary embodiment and with reference to at least FIGS. 29, 30, and 31, the clothing string clip 100 attaches to a clothing string 304. In this regard, the clothing string clip 100 can comprise more than one raised clothing string ridge 124/158/162/170. The raised clothing string ridge 124/158/162/170 can have contoured clothing string recessed channels 126/160/164/172 along a portion of the peak of the raised clothing string ridge 124/158/162/170. The clothing string clip 100 can also comprise a front plate 112 that has a mounting slot 114, and a hub hole 138. The back side of the front plate 112 can comprise at least one front tab 108, at least one clothing string channel 166, at least one raised spring ridge 148/150 forming a spring recess 180, and more than one raised clothing string ridge 158/162. At least one of the raised clothing string ridges 158/162 is positioned on each side of the clothing string channel 166.

In an exemplary embodiment, the clothing string channel 166 on the back side of the front plate 112 can be formed between a front plate channel tab 168 and one of the front tab 156 which are positioned proximate to each other with a gap therebetween which creates the clothing string channel 166. In operation, there can be more than one front tab 108/156 and more than one back tab 130/176 as may be required and/or desired in a particular embodiment.

The clothing string clip 100 can also comprise a back plate 104 that has an insert hole 146. The back side of the back plate 104 can comprise at least one back tab 130, at least one clothing string channel pressure tab 174, a spring seat 140/142/182, and more than one raised clothing string ridge 124/170. At least one raised clothing string ridge 124/170 is positioned on each side of the clothing string channel pressure tab 174. An insert 136 is fitted into the insert hole 146. In operation, the spring seat 140/142/182 can comprise a raised ring 182 sized in diameter and thickness to allow the spring 132 to fit snuggly within the rotatable hub assembly between the front plate 112 and the back plate 104, and more than one perimeter ring 140/142 to keep the spring 132 in position atop the raised ring 182.

The clothing string clip 100 can also comprise the spring 132 that is positioned on the spring seat 140/142/182 and fitted into the spring recess 180. A fastener 118 passes through the hub hole 138 and fastens with the insert 136 securing the front plate 112 and the back plate 104 together forming a rotatable hub 118/132/136. The back side of the front plate 112 and the back side of the back plate 104 are opposed forming an interior region 152.

In an exemplary embodiment, the diameter of the spring seat 140/142/182 can be configured to fit within the diameter of the spring recess 180 retaining the spring 132 therein when the front plate 112 and back plate 104 are fastened together. In this regard, spring 132 is captured within the spring recess 180 and contained within the boundaries of the spring seat 140/142/182.

In an exemplary embodiment, the spring 132 can be fabricated from rubber, plastic, metal, a combination thereof, or other suitable materials as may be required and/or desired in a particular embodiment.

In operation, user 202 can pivot 404 the rotatable hub 118/132/136 opening the front plate 112 with respect to the back plate 104. In the open position, the interior region 152 is exposed including at least the contoured clothing string recessed channels 126/160/164/172. User 202 can insert a clothing string 304 across the contoured clothing string recessed channels 126/160/164/172 and into the clothing string channel 166. Once the clothing string 304 has been inserted as mentioned above, user 202 can release the top plate 112, the spring 132 pivots 404 the rotatable hub 118/132/136, aligning the top plate 112 and the back plate 104 in a closed position. In the closed position, the clothing string clip 100 constricts and friction grips the clothing string 304 within the contoured clothing string recessed channels 126/160/164/172 and clothing string channel 166, abating slipping of the clothing string clip 100 along the clothing string 304 during use by user 202.

Use by user 202 can include, as an example and not a limitation, wearing or carrying an article with clothing strings 304 such as clothing, backpacks, and other articles as may be required and/or desired in a particular embodiment.

In an exemplary embodiment, when the clothing string clip 100 is in the closed position, such as illustrated in at least FIG. 25, the contoured clothing string recessed channels 126/160/164/172 on the top plate 112 and back plate 104 are aligned along a central reference line 408 as illustrated in at least FIG. 29 allowing the clothing string 304 to pass in a gripping manner centrally through the interior region 152 of the clothing string clip 100.

Additionally, the raised clothing string ridges 124/158/162/170 and the contoured clothing string recessed channels 126/160/164/172 are offset with respect to each other between the front plate 112 and back plate 104 so that in operation they don't bind or otherwise interfere with the pivoting 404 and gripping action of the clothing string clip 100 during use.

Figure 32:
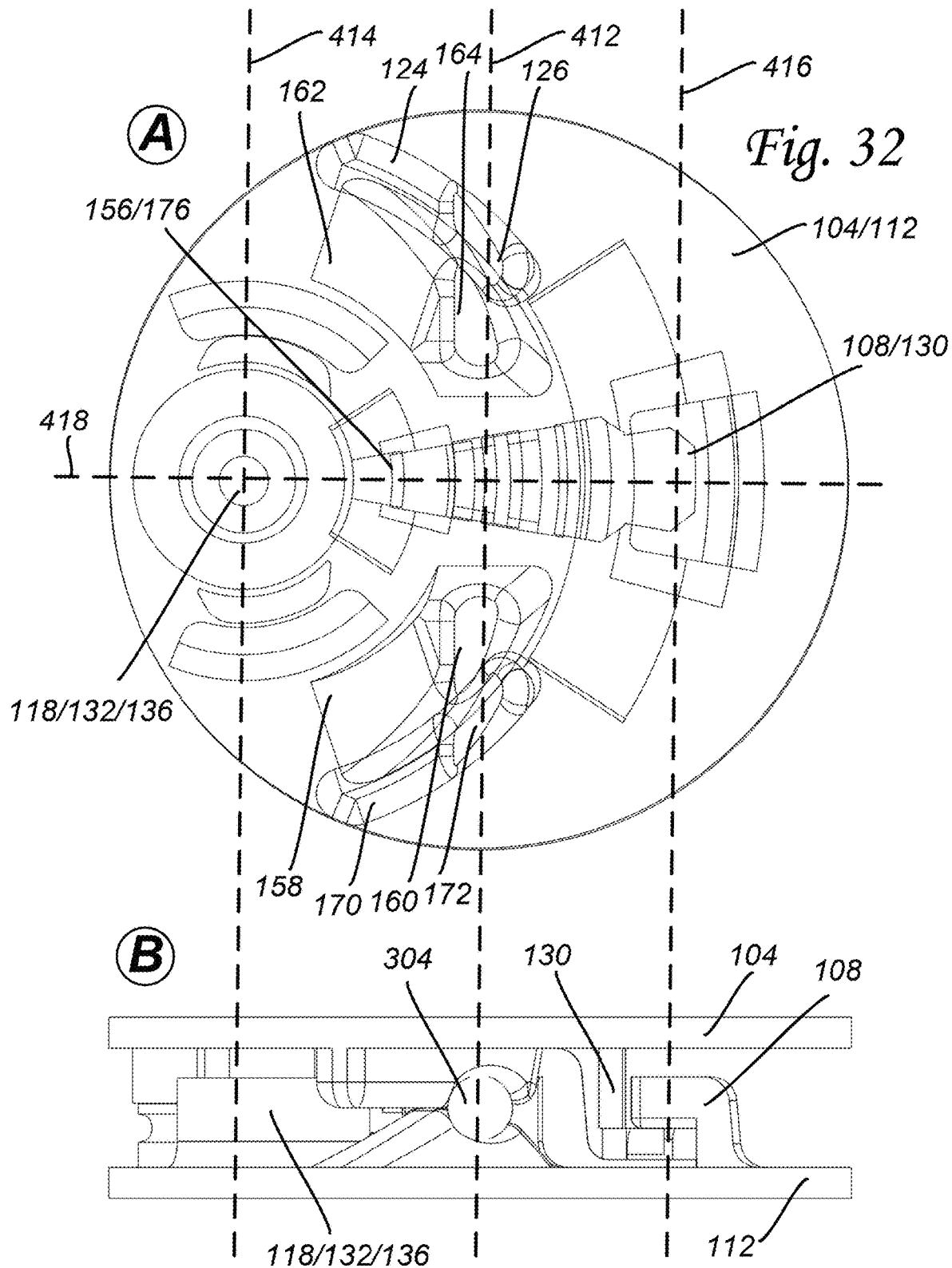
FIG. 32 illustrates one example of a front plate overlaid with a back plate showing interior component alignment.

In an exemplary embodiment and better illustrated in at least FIG. 32, when the clothing string clip 100 is in the closed position the contoured clothing string recessed channels 160/164 on the top plate 112 and the contoured clothing string recessed channels 126/172 on the back plate 104 are adjacent forming a constriction point between the contoured clothing string recessed channels 160/172 and 126/164 that pinches or otherwise friction grips the clothing string 304 therebetween. In operation, the clothing string 304 is tightly held in position within the interior region 152 of the clothing string clip 100.

Referring to FIG. 32 there is illustrated one example of a front plate 112 overlaid with a back plate 104 showing the interior component alignment. In FIG. 32, reference 'A' is a front view of the clothing string clip 100, and reference 'B' is a top view of the clothing string clip 100.

In an exemplary embodiment, when the clothing string clip 100 is in the closed position the front tab 108 and the back tab 130 interlock in a removable manner, pulling the front plate 112 and the back plate 104 closer together, constricting tightly the clothing string 304 between the contoured clothing string recessed channels 126/160/164/172.

In an exemplary embodiment, more than one set of front tabs 108/156 and more than one set of back tabs 130/176 can be utilized. In such an embodiment, when the clothing string clip 100 is in the closed position the front tab 108/156 and the back tabs 130/176 interlock in a removable manner, pulling the front plate 112 and the back plate 104 closer together, constricting tightly the clothing string 304 between the contoured clothing string recessed channels 126/160/164/172.

An advantage, in the present invention, of using such multiple front tabs 108/156 and back tabs 130/176 interconnection points is that a more even constricting force is maintained along the clothing string 304. Such even constricting force better prevents the front plate 112 and back plate 104 from bowing or otherwise separating unequally which can reduce the constricting force, also referred to as friction grip, on the clothing string 304. Such a reduction in constricting force can cause the clothing string to undesirably slip within the clothing string clip 100.

In this regard, in an exemplary embodiment, the clothing string clip 100 can comprise two of the front tabs 108/156 and two of the back tabs 130/176. When the clothing string clip 100 is in the closed position, one pair of the front tab 108 and the back tab 130 interlocks in a removable manner proximate to the mounting slot 114 and the back mounting slot 128, and one pair of the front tab 156 and the back tab 176 interlocks in a removable manner proximate to the orientation slot 116 and the back orientation slot 106, pulling the front plate 112 and the back plate 104 closer together, constricting tightly the clothing string 304 between the contoured clothing string recessed channels 126/160/164/172.

Additionally, in an exemplary embodiment, the front tabs 108/156 and back tabs 130/176 can be right-angled to expose an edge that engenders the front tabs 108/156 and back tabs 130/176 to overlap and more easily interlock or otherwise engage as they come into proximity of each other when the clothing string clip 100 is pivoted 404 closed.

In an exemplary embodiment, when the clothing string clip 100 is in a closed position the front tabs 108/156, the back tabs 130/176, and the rotatable hub 118/132/136 are aligned along a central reference line 418.

In an exemplary embodiment, the rotatable hub 118/132/136 is located 414 proximate to the perimeter of the front plate 114 and back plate 104 at one end of the central reference line 418 and the front tab 108 and the back tab 130 are located 416 proximate to the perimeter of the front plate 112 and the back plate 104 at the opposite end of the central reference line 418.

In an exemplary embodiment where additional front tab 156 and back tab 176 are used, the front tab 156 and the back tab 176 can be located 412 proximate to the center of the front plate 112 and the back plate 104 near the midpoint of the central reference line 418.

In an exemplary embodiment, the raised clothing string ridge 124/158/162/170 can be curvilinear is shape to increase their length and better align with each other. Additionally, the curvilinear shape of the raised clothing string ridge 124/158/162/170 allows the clothing string clip 100 to operate more smoothly with the rotational motion associated with the rotatable hub 118/132/136, and fit better on the back surfaces of the front plate 112 and back plate 104 with a circular shaped clothing string clip 100.

Figure 33:
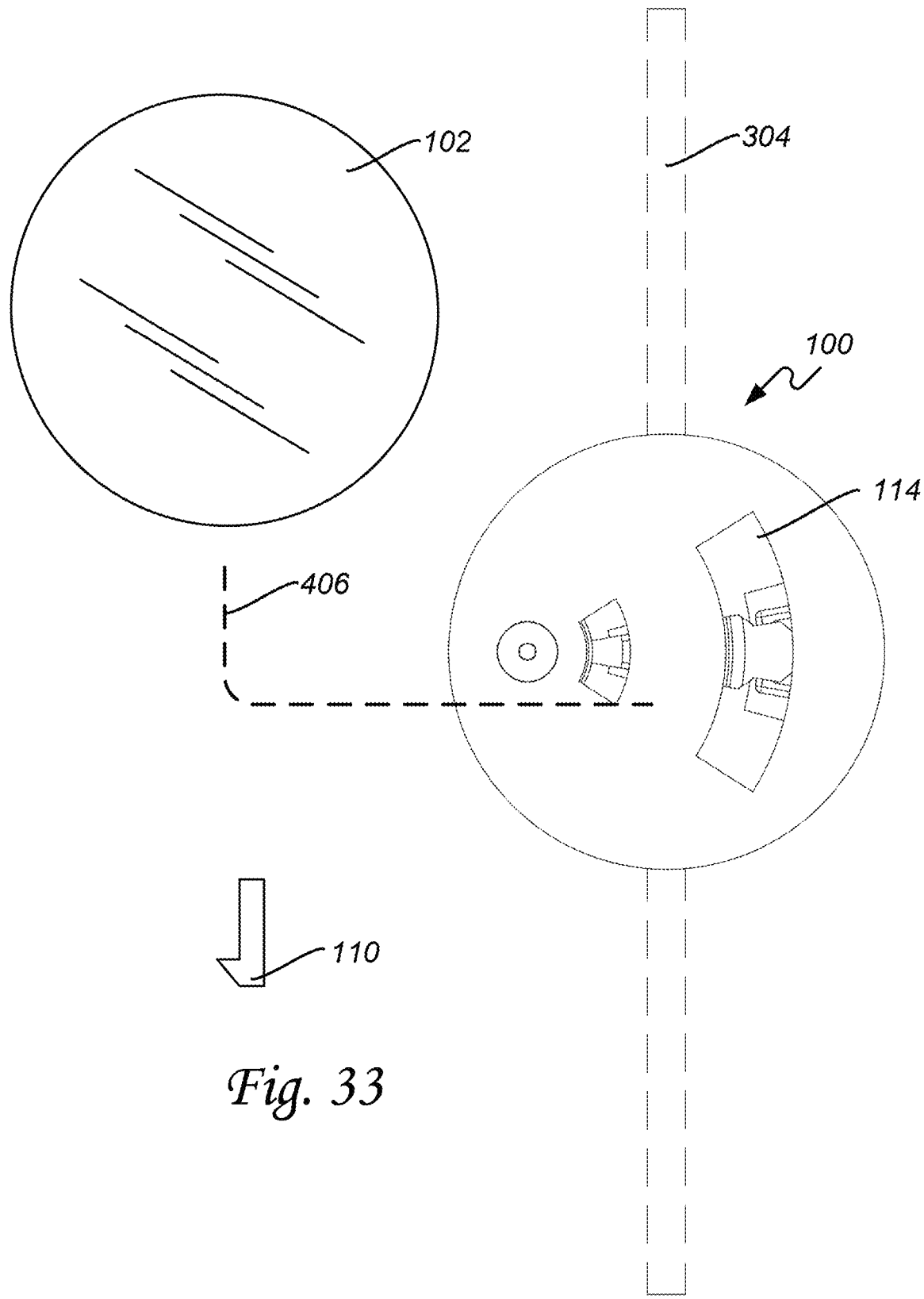
FIG. 33 illustrates one example of a front view of a clothing string clip with an emblem attachment.

Referring to FIG. 33 there is illustrated one example of a front view of a clothing string clip 100 with an emblem attachment. In an exemplary embodiment, the emblem 102 can comprise at least one clip 110 or other suitable size/shape/configuration clip 110 as better illustrated in at least FIG. 37 that can interconnect 406 with the mounting slot 114 to secure the emblem 102 to the front plate 112 or back plate 104 as may be required and/or desired in a particular embodiment.

In an exemplary embodiment, emblem 102 can be attached to the front plate 112 or back plate 104 by way of clip 110, adhesive, hook-and-loop, or other suitable methods as may be required and/or desired in a particular embodiment. In this regard, mounting slots 114/128 and orientation slots 106/116 can be utilized regardless of the method in which the emblem is fastened to the clothing string clip 100.

In another exemplary embodiment, the front plate 112 can comprise a mounting slot 114 and an orientation slot 116 where the emblem 102 can be fastened. In operation, the orientation slot 116 can be used to not only retain the emblem 102 but also to provide orientation allowing the emblem 102 to interconnect and fasten in only one location and in only one orientation on the surface of the front plate 112.

In a similar manner, in an exemplary embodiment and as better illustrated in at least FIG. 31, the back plate 104 can comprise a back mounting slot 128 where the emblem 102 can be fastened.

In another exemplary embodiment, the back plate 104 can comprise a back mounting slot 128 and a back orientation slot 106 where the emblem 102 can be fastened. In operation, the back orientation slot 106 can be used to not only retain the emblem 102 but also to provide orientation allowing the emblem 102 to interconnect and fasten in only one location and in only one orientation on the surface of the back plate 104.

As such, an emblem 102 can be attached to the outer surface of the back plate 104 by way of a back mounting slot 128. The back plate 104 can comprise the back mounting slot 128.

Additionally, an emblem 102 can be attached to the outer surface of the back plate 104 by way of a back mounting slot 128 and the back orientation slot 106. The back plate 104 can comprise the back mounting slot 128 and the back orientation slot 106.

In an exemplary embodiment, the mounting slot 114 and the back mounting slot 128 are different sizes to discriminate between which of the emblem 102 can be fastened on the front plate 112 and which of the emblem 102 can be fastened on the back plate 104. In this regard, the different-sized mounting slot 114 and back mounting slot 128 can be used to force which of the emblems 102 can be interconnected to the clothing string clip 102 including on which side (front plate 112 or back plate 104).

Figure 34:
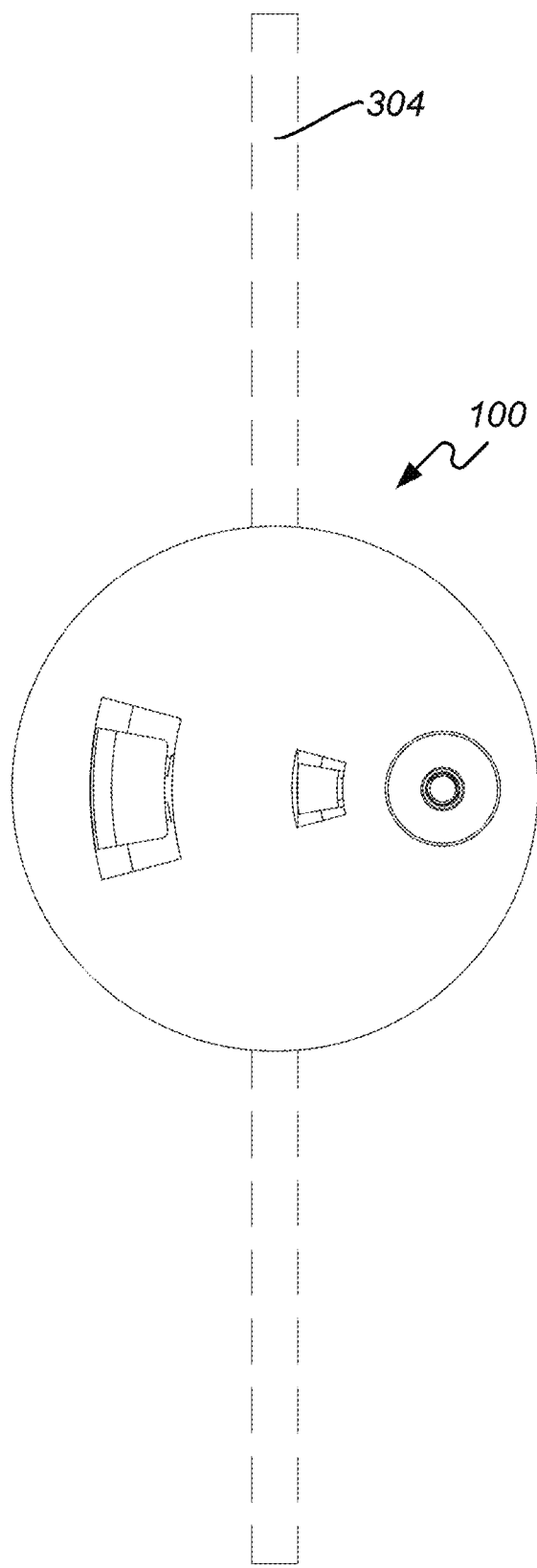
FIG. 34 illustrates one example of a back view of a clothing string clip.
Figure 36:
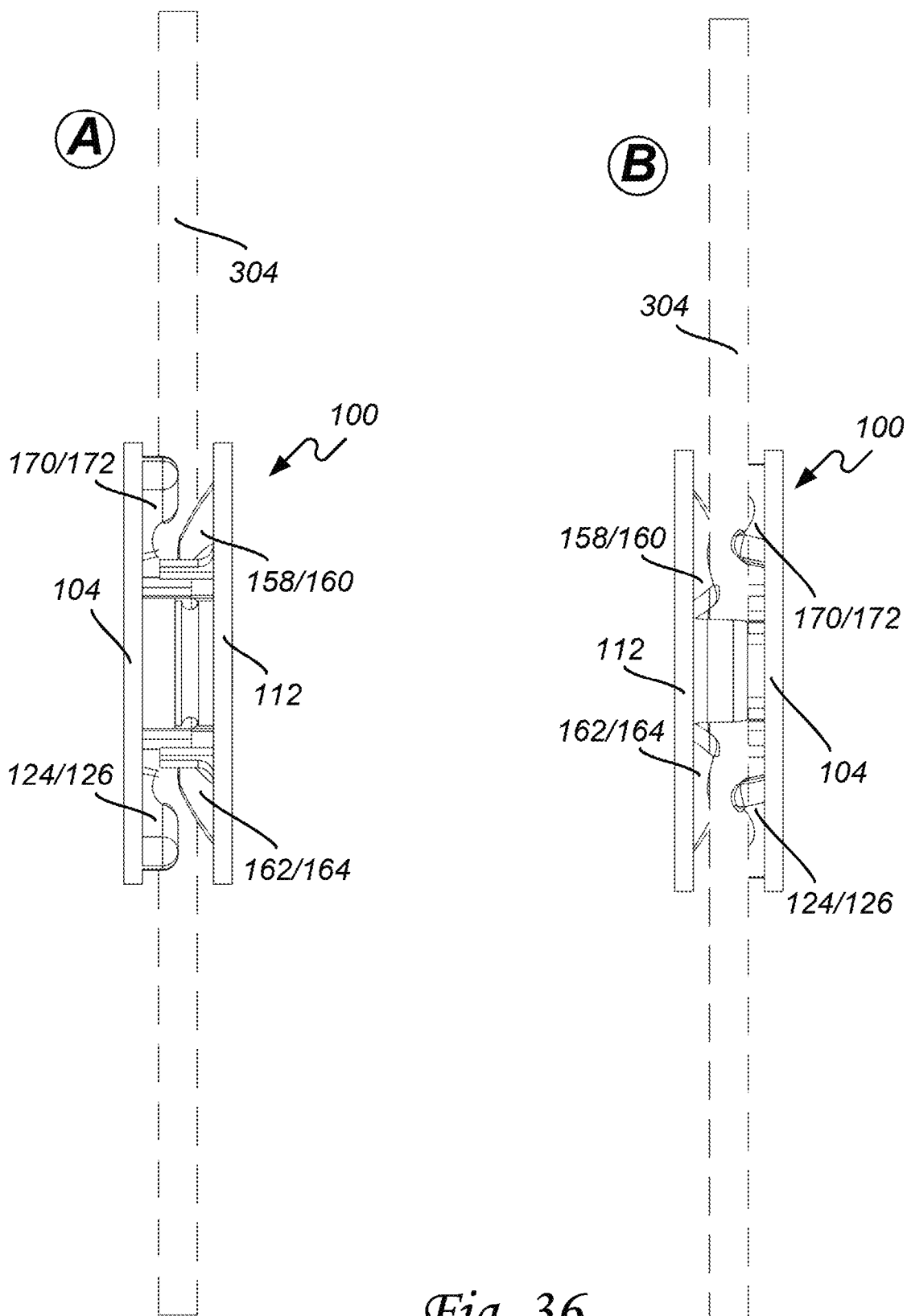
FIG. 36 illustrates one example of a left side view and a right side view of a clothing string clip.

Referring to FIG. 34 there is illustrated one example of a back view of a clothing string clip 100. Referring to FIG. 35 there is illustrated one example of a top view in reference 'A' and a bottom view in reference 'B' of a clothing string clip 100. And, referring to FIG. 36 there is illustrated one example of a left side view in reference 'A' and a right side view in reference 'B' of a clothing string clip 100.

In an exemplary embodiment, a clothing string clip 100 can be attached to clothing strings 304. In this regard, the clothing string clip 100 can comprise more than one raised clothing string ridge 124/158/162/170 each having a contoured clothing string recessed channel 126/160/164/172 along a portion of the peak of the raised clothing string ridge 124/158/162/170.

The clothing string clip 100 further comprises a front plate 112 having a mounting slot 114, and a hub hole 138. The back side of the front plate 112 comprises at least one front tab 108, at least one clothing string channel 166, at least one raised spring ridge 148/150 forming a spring recess 180, and more than one of the raised clothing string ridges 158/162. At least one of the raised clothing string ridges 158/162 is positioned on each side of the clothing string channel 166.

The clothing string clip 100 further comprises a back plate 104 having an insert hole 146. The back side of the back plate 104 comprises at least one back tab 130, at least one clothing string channel pressure tab 174, a spring seat 140/142/182, and more than one of the raised clothing string ridges 124/170. At least one of the raised clothing string ridges 124/170 is positioned on each side of the clothing string channel pressure tab 174. An insert 136 can be fitted into the insert hole 146.

The clothing string clip 100 further comprises a spring 132 that is positioned on the spring seat 140/142/182 and fitted into the spring recess 180. A fastener 118 passes through the hub hole 138 and fastens with the insert 136 securing the front plate 112 and the back plate 104 together forming a rotatable hub 118/132/136. The back side of the front plate 112 and the back side of the back plate 104 are opposed forming an interior region 152. An emblem 102 can be secured by way of the mounting slot 114 to the outer surface of the front plate 112.

In operation, user 202 can pivot 404 the rotatable hub 118/132/136 opening the front plate 112 with respect to the back plate 104. In the open position, a portion of the interior region 152 is exposed including at least the contoured clothing string recessed channels 126/160/164/172. The user 202 can insert a clothing string 304 across the contoured clothing string recessed channels 126/160/164/172 and into the clothing string channel 166.

The user 202 can then release the top plate 112. The spring 132 pivots 404 the rotatable hub 118/136/136, aligning the top plate 112 and the back plate 104 closed. In the closed position, the front tab 108 and the back tab 130 interlock in a removable manner pulling the front plate 112 and the back plate 104 together. The clothing string clip 100 constricts and friction grips the clothing string 304 within the contoured clothing string recessed channels 126/160/164/172, and the clothing string channel pressure tab 174 aligns within the clothing string channel 166, retaining the clothing string 304 within the clothing string channel 116 and applying pinch pressure to the clothing string 304 against back side of the front plate 112 by way of the clothing string channel pressure tab 174, abating slipping of the clothing string clip 100 along the clothing string 304 during use by user 202.

Figure 37:
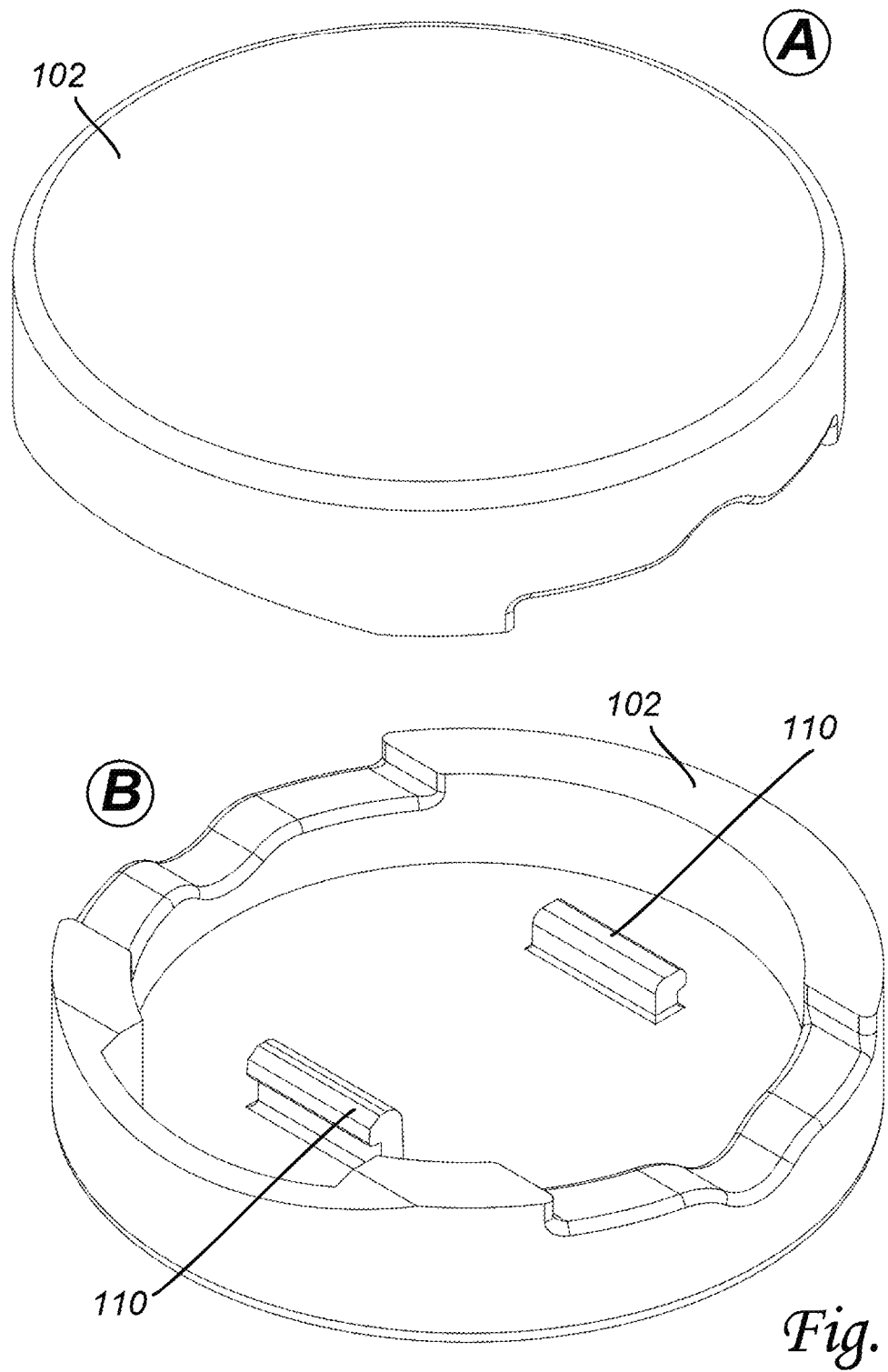
FIG. 37 illustrates one example of an emblem.

Referring to FIG. 37 illustrates one example of a top perspective view in reference 'A' and a back perspective view in reference 'B'. In an exemplary embodiment, emblem 102 can be secured by way of clips 110 to the mounting slot 114 on the outer surface of the front plate 112 and/or the back mounting slot 128 on the outer surface of the back plate 104 as may be required and/or desired in a particular embodiment.

Referring to FIG. 38 there are illustrated exemplary embodiment of emblems that can be interchangeably used in the present invention. For example, and not a limitation, in reference 'A' a pair of animal or wildlife emblems 102A and 102B can be secured to the front plate 112 and the back plate 104. In reference 'B' a pair of team or logo emblems 102A and 102B can be secured to the front plate 112 and the back plate 104. And, in reference 'C' a pair of sport or athletic emblems 102A and 102B can be secured to the front plate 112 and the back plate 104.

Figure 39:
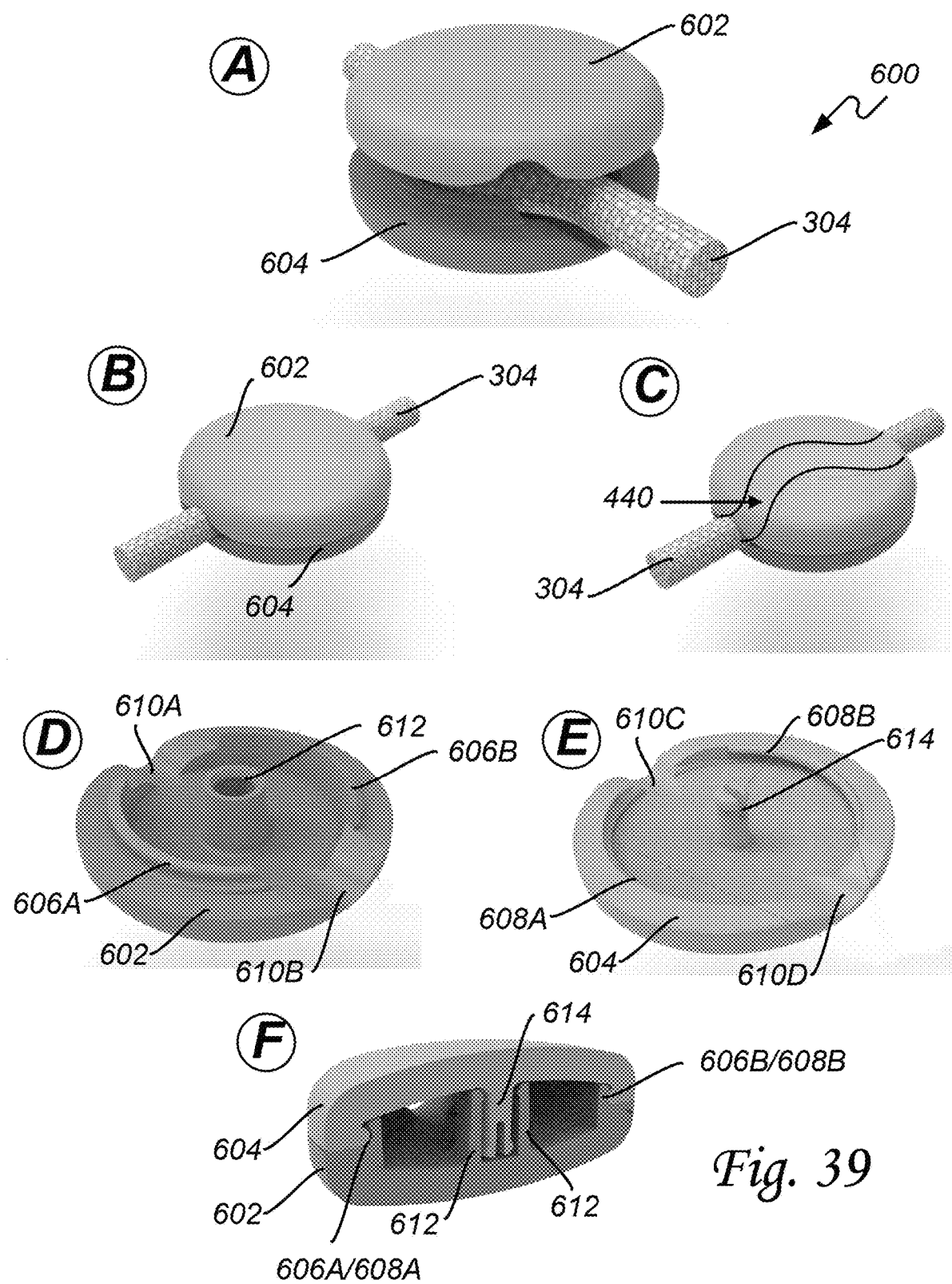
FIG. 39 illustrates one example of a clothing cord clip that snaps together.

Referring to FIG. 39, there is illustrated one example of a clothing cord clip 600. In an exemplary embodiment, in reference 'A' a front plate 602 and a back plate 604 can be aligned and snapped together around a clothing cord 304. Reference 'B' illustrates the assembled clothing cord clip 600. Reference 'C' illustrates pathway 440 of the clothing cord 304 through the clothing cord clip 600, notably around a connection peg 614 and receptacle 612. Reference 'D' illustrates the top plate 602 which comprises more than one of a locking rib 606A-B, a recess channel 610A-B for the clothing cord 304, and the receptacle 612. Reference 'E' illustrates the back plate 604 which comprises more than one locking edge 608A-B, a recess channel 610C-D for the clothing cord 304, and the connection peg 614. Reference 'F' is a section view of the assembled clothing cord clip 600.

In operation, the locking ribs 606A-B and the locking edge 608A-B as well as the connection peg 614 and the receptacle 612 each interlock hold the top plate 602 and the bottom plate 604 together with the clothing cord captured therebetween.

Figure 40:
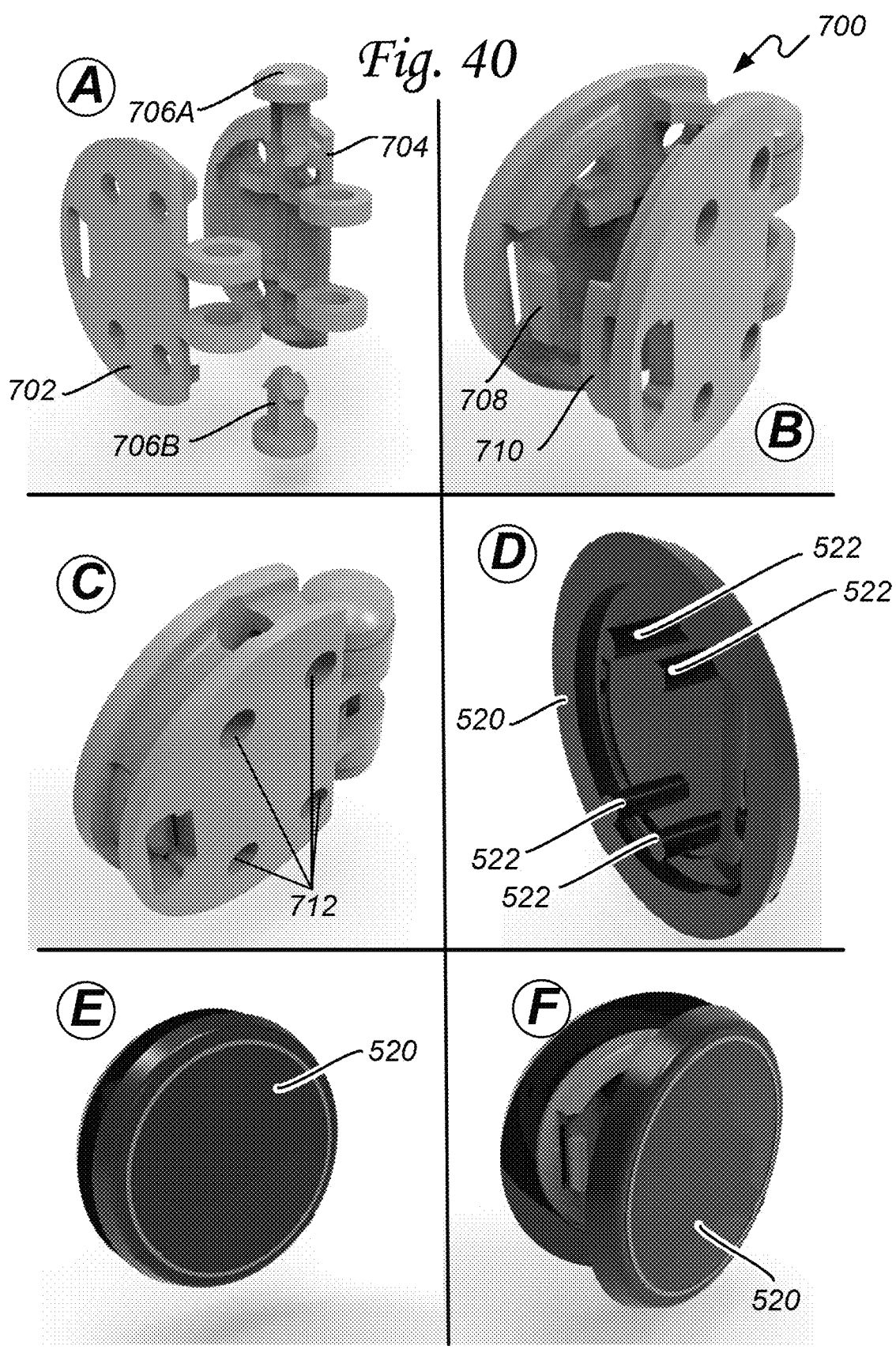
FIG. 40 illustrates one example of a clothing cord clip that hinges together.

Referring to FIG. 40, there is illustrated one example of a clothing cord clip 700. In reference 'A', a front plate 702 and back plate 704 can be fastened together in a movable hinged manner by way of locking pins 706A-B. Reference 'B' illustrates tab 708 and latch 710 that can be interconnected to fasten the clothing cord clip 700 together. Reference 'C' illustrates the closed clothing cord clip 700 having more than one emblem mounting hole 712. Such emblem mounting holes can be on the front plate 702 and the back plate 704. Reference 'D' illustrates the emblem 500 with pegs legs 522. References 'E' and 'F' illustrate the emblems 520 fitted to the front plate 702 and back plate 704 by way of the peg legs 522 inserted into the emblem mounting holes 712. Such emblems 520 can be snap fitted in a removable manner or adhered in a permanent manner, as may be required and/or desired in a particular embodiment.

Figure 41:
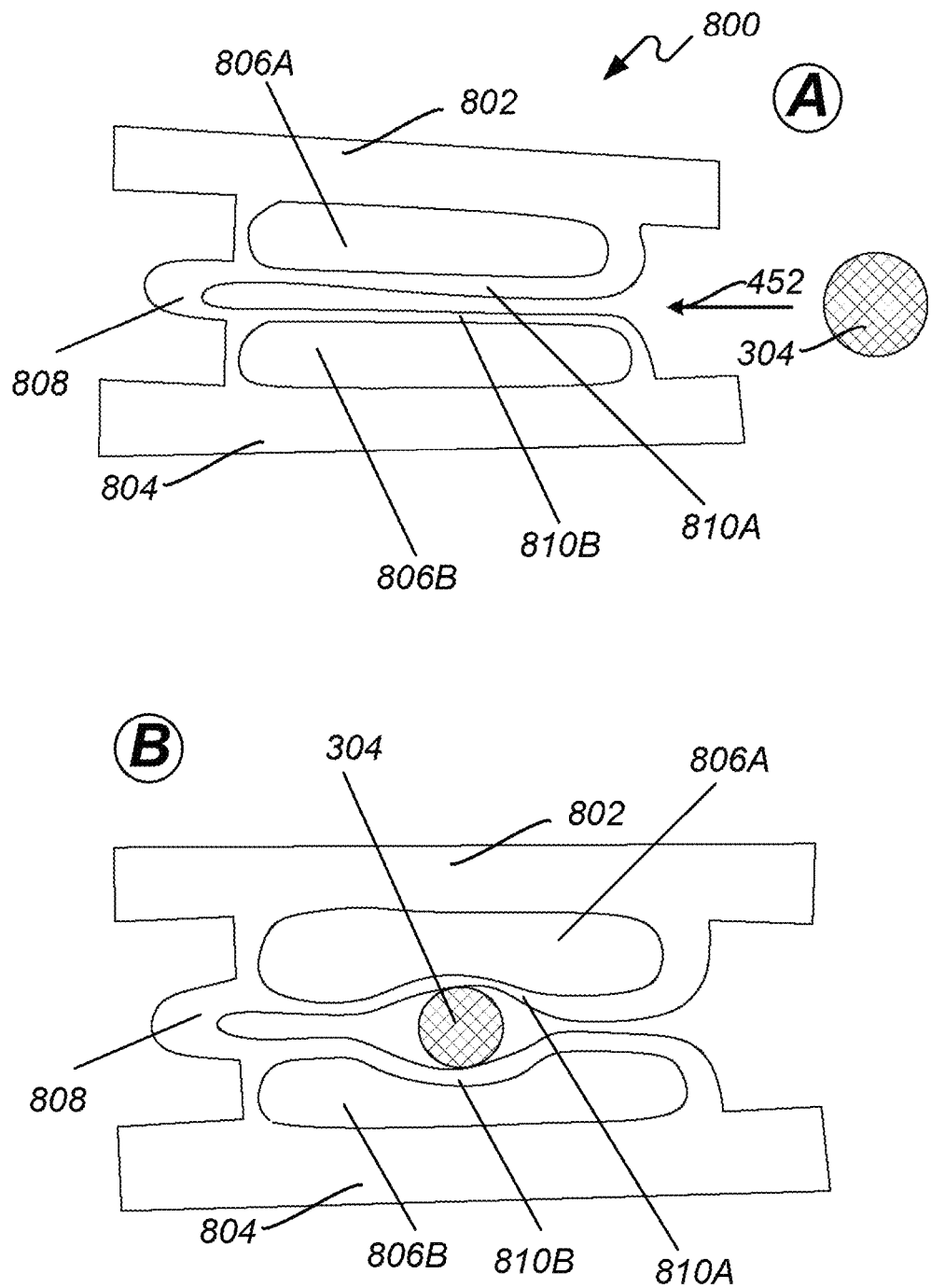

Referring to FIG. 41, there is illustrated one example of a clothing cord clip 800. In an exemplary embodiment, in reference 'A', a front plate 802 can comprise a flexible membrane 810A that forms a flexible bubble 806A, and a back plate 804 can comprise a flexible membrane 810B that forms a flexible bubble 806B. The top plate 802 and the back plate 804 can be rigidly connected at a hinge 808 point, the flexible membranes 810A-B and correspondingly the flexible bubbles 806A-B are opposed and drawing snuggly together in a manner that a clothing cord 304 can be slid 452 between the flexible bubbles 806A-B and retained therebetween by way of the flexible membranes 810A-B. Reference 'B' illustrates the clothing cord 304 being retained between the flexible bubbles 806A-B such that the clothing cord clip 800 can hang from the clothing cord 304. In operation, the flexible bubbles 806A-B under compression apply a force again the cord 302 by way of the flexible membranes 810A-B holding clothing cord clip 800 in place on the cord 302.

Referring to FIG. 42, there is illustrated one example of a clothing cord clip. In an exemplary embodiment, a top plate 802 and a bottom plate 804 are integrally formed together by way of a hinge portion 808 forming a tight clip with an opening for a clothing cord 304 to slide therebetween.

Referring to FIG. 43, there is illustrated one example of a clothing cord clip. In reference 'A', a top plate 802 can comprise a gripping rib 806A, and a back plate 804 can comprise a gripping rib 806B. The gripping ribs 806A-B can be integrally formed together by way of a hinge 808 portion such that a clothing cord 304 can be slid 454 therebetween. Reference 'B' is a perspective view and reference 'C' is a front view of the clothing cord clip.

Figure 44:
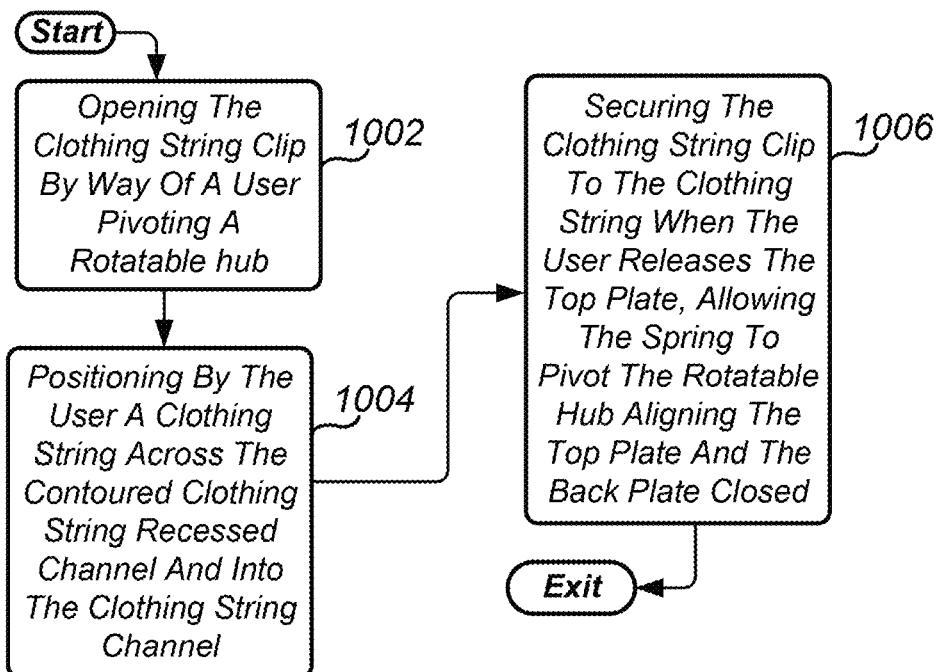
FIG. 44 illustrates one example of a method of using a clothing string clip that attaches to clothing strings.

Referring to FIG. 44 there is illustrated one example of a method of using a clothing string clip that attaches to clothing strings. In an exemplary embodiment, the method begins in step 1002.

In step 1002, the clothing string clip 100 is opened by way of user 202 pivoting a rotatable hub 118/132/136. The clothing string clip 100 comprises more than one raised clothing string ridge 124/158/162/170 having a contoured clothing string recessed channel 126/160/164/172 along a portion of the peak of the raised clothing string ridge 124/158/162/170. A front plate 112 has a mounting slot 114, and a hub hole 138. The back side of the front plate 112 comprises at least one front tab 114/116, at least one clothing string channel 166, at least one raised spring ridge 148/150 forming a spring recess 180, and more than one raised clothing string ridge 158/162. At least one raised clothing string ridge 158/162 is positioned on each side of the clothing string channel 166.

A back plate 104 has an insert hole 146. The back side of the back plate 104 comprises at least one back tab 130, at least one clothing string channel pressure tab 174, a spring seat 182, and more than one of the raised clothing string ridges 124/170. At least one raised clothing string ridge 127/170 is positioned on each side of the clothing string channel pressure tab 174. An insert 136 is fitted into the insert hole 146, and a spring 132 is positioned on the spring seat 140/142/182 and fitted into the spring recess 180.

A fastener 118 passes through the hub hole 138 and fastens with the insert 136 securing the front plate 112 and the back plate 104 together forming the rotatable hub 118/132/136. The back side of the front plate 112 and the back side of the back plate 104 are opposed forming an interior region 152.

In operation, user 202 opens the front plate 112 with respect to the back plate 10. The open position exposes a portion of the interior region 152 including at least the contoured clothing string recessed channels 126/160/164/172. The method then moves to step 1004.

In step 1004, a clothing string 304 is positioned by user 202 across the contoured clothing string recessed channels 126/160/164/172 and into the clothing string channel 166. The method then moves to step 1006.

In step 1006, the clothing string clip 100 is secured to the clothing string 304 when user 202 releases the top plate 112, allowing the spring 132 to pivot 404 the rotatable hub 118/132/136, aligning the top plate 112 and the back plate 104 closed. In the closed position, the clothing string clip 100 constricts and friction grips the clothing string 304 within the contoured clothing string recessed channels 126/160/164/172, and the clothing string channel pressure tab 174 aligns within the clothing string channel 166, retaining the clothing string 304 within the clothing string channel 166 and applying pinch pressure to the clothing string 304 against back side of the front plate 112 by way of the clothing string channel pressure tab 174, abating slipping of the clothing string clip 100 along the clothing string 304 during use by user 202. The method is then exited.

Figure 45:
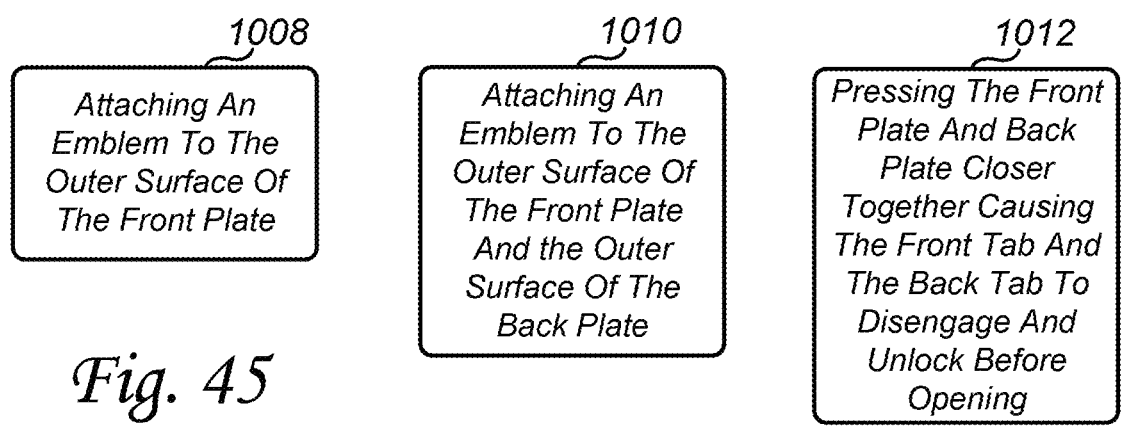
FIG. 45 illustrates exemplary embodiments that can be interchangeably used with the methods of the present invention.

Referring to FIG. 45 there are illustrated exemplary embodiments that can be interchangeably used with the methods of the present invention.

In step 1008, an emblem 102 can be attached to the outer surface of the front plate 112 by way of the mounting slot 114.

In step 1010, an emblem 102 can be attached to the outer surface of the front plate 112 by way of the mounting slot 114 and an emblem 102 can be attached to the outer surface of the back plate 104 by way of a back mounting slot 128. The back plate 104 comprises the back mounting slot 128.

In step 1012, the front plate 112 and the back plate 104 can be pressed closer together causing the front tab 103 and the back tab 130 to disengage and unlock allowing the front plate 112 to be pivoted open with respect to the back plate 104.

Figure 46:
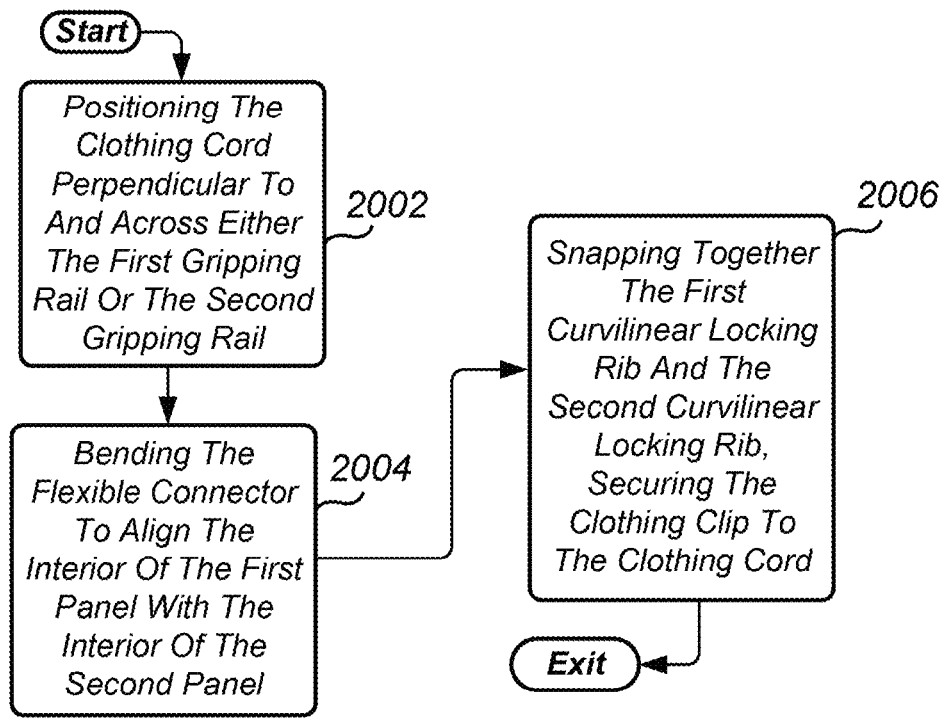
FIGS. 46-47 illustrates examples of a method of using the clothing cord clip.

Referring to FIG. 46, there is illustrated one example of a method of using a clothing cord clip 500. In an exemplary embodiment, the method begins in step 2002 by positioning the clothing cord 304 perpendicular to and across either the first gripping rail 508A or the second gripping rail 508B.

The method continues in step 2004 by bending 422 the flexible connector 506 to align the first interior surface 532 of the front plate with the interior of the back plate.

The method continues in step 2006 by snapping together the first curvilinear locking rib 512A-B and the second curvilinear locking rib 512C-D retaining the clothing cord 304 in place by pinching the clothing cord 304 with the first gripping rail 508A and the second gripping rail 508B, securing the clothing cord clip 500 to the clothing cord 304. The method is then exited.

In an exemplary embodiment, the clothing cord clip 500 can be removed from the clothing cord 304 by unsnapping the first curvilinear locking rib 512A-B and the second curvilinear locking rib 512C-D.

Figure 47:
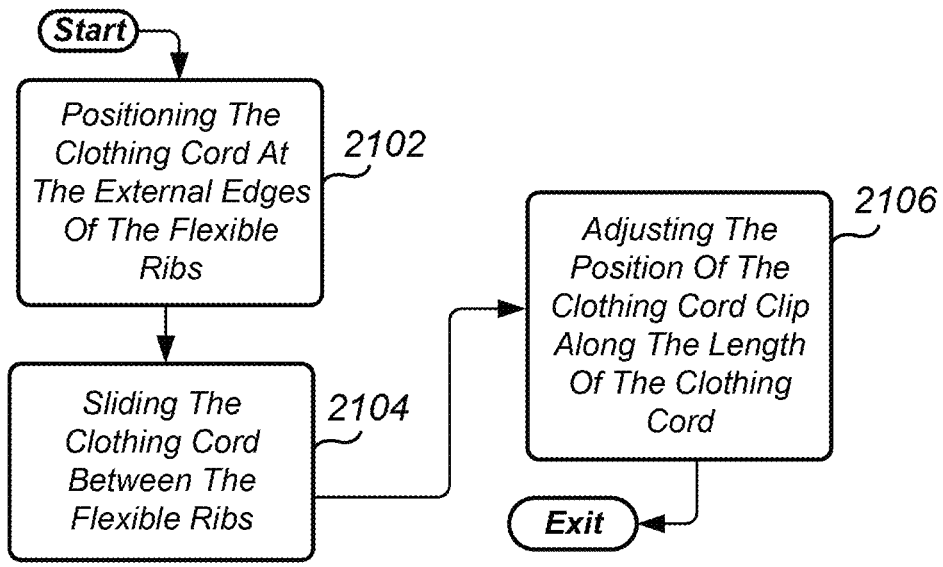

Referring to FIG. 47 and with reference to FIGS. 41-43, there is illustrated one example of a method of using a clothing cord clip 800. In an exemplary embodiment, the method begins in step 2102 by positioning the clothing cord 302 at the external edges of the flexible bubbles 806A-B.

The method continues in step 2104 by sliding the clothing cord between the flexible bubbles 806A-B and then in step 2106 by adjusting the position of the clothing clip 800 along the length of the clothing cord 304 by sliding it up or down the clothing cord 304.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A clothing cord clip comprising:
   a front plate having a first exterior surface and a first interior surface, the first interior surface comprises at least one of a first gripping rail, a pinch ring positioned around the first gripping rail, more than one of a first curvilinear locking rib positioned around the pinch ring, and more than one of a first raised support rib positioned around the first curvilinear locking rib;
   a back plate having a second exterior surface and a second interior surface, the second interior surface comprises at least one of a second gripping rail, more than one of a second curvilinear locking rib positioned around the second gripping rail, and more than one of a second raised support rib positioned around the second curvilinear locking rib; and
   a flexible connector interconnects the front plate and the back plate, allowing the first interior surface and the second interior surface to be opposed, aligned, and press-fitted together by interlocking the first curvilinear locking rib and the second curvilinear locking rib, wherein at least one of a clothing cord is positioned between the first gripping rail and the second gripping rail, the clothing cord is secured between the pinch ring and the first gripping rail, the pinch ring and the second gripping rail, the first gripping rail and the second interior surface, and the second gripping rail and the first interior surface.

2. The clothing cord clip in accordance with claim 1, further comprises:

at least one of an emblem is affixed to at least one of the first exterior surface or the second exterior surface.

3. The clothing cord clip in accordance with claim 1, the front plate having at least one of a first emblem mounting hole therethrough, and the back plate having at least one of a second emblem mounting hole therethrough.

4. The clothing cord clip in accordance with claim 3, further comprising:
at least one of an emblem, the emblem comprises at least one of a peg leg, the peg leg is fitted through the first emblem mounting hole to secure the emblem to the first exterior surface of the front plate, or the peg leg is fitted through the second emblem mounting hole to secure the emblem to the second exterior surface of the back plate.

5. The clothing cord clip in accordance with claim 1, each of the first emblem mounting hole is positioned to intersect the first raised support rib, and each of the second emblem mounting hole is positioned to intersect the second raised support rib.

6. The clothing cord clip in accordance with claim 1, the first gripping rail comprises a first set of teeth formed along the edge that contacts the clothing cord, or the second gripping rail comprises a second set of teeth formed along the edge that contacts the clothing cord.

7. The clothing cord clip in accordance with claim 1, the front plate comprises a first recess channel that traverses the central portion of the first interior surface and the back plate comprises a second recess channel that traverses the central portion of the second interior surface, when the front plate and the back plate are interlocked together the first recess channel and the second recess channel are opposed and aligned creating an ingress and egress pathway for the clothing cord, through the clothing cord clip.

8. The clothing cord clip in accordance with claim 7, each of the first curvilinear locking rib and the first curvilinear support rail begin and end at a first boundary edge of the first recess, and each of the second curvilinear locking rib and the second curvilinear support rail begin and end at a second boundary edge of the second recess.

9. The clothing cord clip in accordance with claim 7, the first gripping rail runs perpendicular to and extends beyond the first recess channel, and the second gripping rail runs perpendicular to and extends beyond the second recess channel.

10. The clothing cord clip in accordance with claim 1, when the front plate and the back plate are interlocked together the first curvilinear support rail and the second curvilinear support rail are opposed, aligned, and contact each other establishing a fixed distance between the front plate and the back plate.

11. A method of using the clothing cord clip of claim 1 comprising the steps of:
positioning the clothing cord perpendicular to and across either the first gripping rail or the second gripping rail;
bending the flexible connector to align the first interior surface of the front plate with the second interior surface of the back plate; and
snapping together the first curvilinear locking rib and the second curvilinear locking rib retaining the clothing cord in place by pinching the clothing cord with the first gripping rail and the second gripping rail, securing the clothing cord clip to the clothing cord.

12. A clothing cord clip comprising:
a front plate having a first exterior surface and a first interior surface, the first interior surface comprises at least one of a first gripping rail, a pinch ring positioned around the first gripping rail, more than one of a first curvilinear locking rib positioned around the pinch ring, more than one of a first raised support rib positioned around the first curvilinear locking rib, and a first recess channel that traverses the first interior surface;
a back plate having a second exterior surface and a second interior surface, the second interior surface comprises at least one of a second gripping rail, more than one of a second curvilinear locking rib positioned around the second gripping rail, more than one of a second raised support rib positioned around the second curvilinear locking rib, and a second recess channel that traverses the second interior surface; and
a flexible connector interconnects the front plate and the back plate, allowing the first interior surface and the second interior surface to be opposed, aligned, and press-fitted together by interlocking the first curvilinear locking rib and the second curvilinear locking rib;
wherein when the front plate and the back plate are interlocked together the first recess channel and the second recess channel are opposed and aligned, creating an ingress and egress pathway for the clothing cord, through the clothing cord clip;
wherein, at least one of a clothing cord is positioned through the first channel recess and the second channel recess and between the first gripping rail and the second gripping rail, the clothing cord is secured between the pinch ring and the first gripping rail, the pinch ring and the second gripping rail, the first gripping rail and the second interior surface, and the second gripping rail and the first interior surface.

13. The clothing cord clip in accordance with claim 12, further comprises:
at least one of an emblem is affixed to at least one of the first exterior surface or the second exterior surface.

14. The clothing cord clip in accordance with claim 12, the front plate having more than one of a first emblem mounting hole therethrough, and the back plate having more than one of a second emblem mounting hole therethrough.

15. The clothing cord clip in accordance with claim 14, further comprising:
at least one of an emblem, the emblem comprises at least one of a peg leg, the peg leg is fitted through the first emblem mounting hole to secure the emblem to the first exterior surface of the front plate, or the peg leg is fitted through the second emblem mounting hole to secure the emblem to the second exterior surface of the back plate.

16. The clothing cord clip in accordance with claim 12, each of the first emblem mounting hole is positioned to intersect the first raised support rib, and each of the second emblem mounting hole is positioned to intersect the second raised support rib.

17. The clothing cord clip in accordance with claim 12, the first gripping rail comprises a first set of teeth formed along the edge that contacts the clothing cord, or the second gripping rail comprises a second set of teeth formed along the edge that contacts the clothing cord.

18. A clothing cord clip comprising:
a front plate having a first exterior surface and a first interior surface, the first interior surface comprises at least one of a first gripping rail, a pinch ring positioned around the first gripping rail, more than one of a first curvilinear locking rib positioned around the pinch ring, and more than one of a first raised support rib positioned around the first curvilinear locking rib;

a back plate having a second exterior surface and a second interior surface, the second interior surface comprises at least one of a second gripping rail, more than one of a second curvilinear locking rib positioned around the second gripping rail, and more than one of a second raised support rib positioned around the second curvilinear locking rib;

a flexible connector interconnects the front plate and the back plate, allowing the first interior surface and the second interior surface to be opposed, aligned, and press-fitted together by interlocking the first curvilinear locking rib and the second curvilinear locking rib; and at least one of an emblem is secured to at least one of the first exterior surface or the second exterior surface;

wherein at least one of a clothing cord is positioned between the first gripping rail and the second gripping rail, the clothing cord is secured between the pinch ring and the first gripping rail, the pinch ring and the second gripping rail, the first gripping rail and the second interior surface, and the second gripping rail and the first interior surface.

19. The clothing cord clip in accordance with claim 18, the first gripping rail comprises a first set of teeth formed along the edge that contacts the clothing cord, and the second gripping rail comprises a second set of teeth formed along the edge that contacts the clothing cord.

20. The clothing cord clip in accordance with claim 18, the front plate having more than one of a first emblem mounting hole therethrough, and the back plate having more than one of a second emblem mounting hole therethrough, each of the first emblem mounting hole is positioned to intersect the first raised support rib, and each of the second emblem mounting hole is positioned to intersect the second raised support rib.

* * * * *